US012063540B2

(12) United States Patent
Damnjanovic et al.

(10) Patent No.: US 12,063,540 B2
(45) Date of Patent: *Aug. 13, 2024

(54) CHANNEL STATE INFORMATION REPORTING OVER DISCONTINUOUS RECEPTION OPERATIONS

(71) Applicant: QUALCOMM Incorporated, San Diego, CA (US)

(72) Inventors: Jelena Damnjanovic, Del Mar, CA (US); Wooseok Nam, San Diego, CA (US); Tao Luo, San Diego, CA (US); Peter Gaal, San Diego, CA (US); Linhai He, San Diego, CA (US); Peter Pui Lok Ang, San Diego, CA (US); Juan Montojo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/357,579

(22) Filed: Jul. 24, 2023

(65) Prior Publication Data
US 2023/0403594 A1 Dec. 14, 2023

Related U.S. Application Data

(63) Continuation of application No. 17/096,584, filed on Nov. 12, 2020, now Pat. No. 11,792,671.
(Continued)

(51) Int. Cl.
*H04W 24/10* (2009.01)
*H04W 52/02* (2009.01)
(Continued)

(52) U.S. Cl.
CPC ....... *H04W 24/10* (2013.01); *H04W 52/0235* (2013.01); *H04W 72/21* (2023.01); *H04W 72/23* (2023.01)

(58) Field of Classification Search
CPC . H04W 24/10; H04W 52/0235; H04W 72/21; H04W 72/23; H04W 72/542; H04W 76/28; Y02D 30/70
(Continued)

(56) References Cited

U.S. PATENT DOCUMENTS 11,792,672 B2 10/2023 Yao et al.
2011/0039499 A1 2/2011 Zhang et al.
(Continued)

FOREIGN PATENT DOCUMENTS

CN 105165085 A 12/2015
CN 110267329 A 9/2019
(Continued)

OTHER PUBLICATIONS

Apple Inc: "PDCCH Based Power Saving Channel Design for UE Power Saving", 3GPP Draft, R1-1912827, 3GPP TSG RAN WG1 #99, 3rd Generation Partnership Project (3GPP), Mobile Competence Centre, 650, Route Des Lucioles, F-06921 Sophia-Antipolis Cedex, France, vol., RAN WG1, No. Reno, USA, Nov. 18, 2019-Nov. 22, 2019, Nov. 9, 2019 (Nov. 9, 2019), XP051823627, pp. 1-11, p. 1-p. 9.
(Continued)

*Primary Examiner* — Robert J Lopata
(74) *Attorney, Agent, or Firm* — Kevin M. Donnelly; Holland & Hart LLP

(57) ABSTRACT

Processes, systems, and devices for wireless communications are described. A communication device may monitor a wakeup signal monitoring occasion in an inactive duration of a discontinuous reception (DRX) cycle. The communi-
(Continued)

cation device may transmit, in a first active duration of the DRX cycle, a channel state information (CSI) report on one or more resources based on monitoring the wakeup signal monitoring occasion. In some examples, the communication device may transmit an indication that the communication device requests reporting of the CSI report in the first active duration of the DRX cycle. The communication device may, in some examples, receive, in a second active duration of the DRX cycle, control information for the UE based on the CSI report.

30 Claims, 17 Drawing Sheets

Related U.S. Application Data

(60) Provisional application No. 62/937,104, filed on Nov. 18, 2019.

(51) Int. Cl.
  *H04W 72/21* (2023.01)
  *H04W 72/23* (2023.01)

(58) Field of Classification Search
  USPC .......................................................... 370/329
  See application file for complete search history.

(56) References Cited

U.S. PATENT DOCUMENTS

| | | | |
|---|---|---|---|
| 2018/0249531 A1 | 8/2018 | Feuersaenger et al. | |
| 2018/0324787 A1 | 11/2018 | Yin et al. | |
| 2019/0059129 A1 | 2/2019 | Luo et al. | |
| 2019/0149213 A1 | 5/2019 | Zhou et al. | |
| 2019/0215896 A1 | 7/2019 | Zhou et al. | |
| 2021/0028844 A1* | 1/2021 | Song | H04W 52/02 |
| 2021/0050897 A1* | 2/2021 | Huang | H04L 5/0055 |
| 2021/0136862 A1* | 5/2021 | He | H04B 17/327 |
| 2021/0153054 A1 | 5/2021 | Damnjanovic et al. | |
| 2021/0377852 A1* | 12/2021 | Zhou | H04W 24/10 |
| 2022/0338118 A1* | 10/2022 | Jang | H04B 7/0626 |

FOREIGN PATENT DOCUMENTS

| | | |
|---|---|---|
| KR | 20190117568 A | 10/2019 |
| WO | WO-2019151819 A1 | 8/2019 |
| WO | WO-2019192013 A1 | 10/2019 |

OTHER PUBLICATIONS

International Search Report and Written Opinion—PCT/US2020/060493—ISA/EPO—Feb. 11, 2021

Qualcomm Inc: "Wakeup Signaling and its RAN2 Impact", 3GPP Draft, R2-1903047, 3GPP TSG-RAN WG2 Meeting #105bis, Wakeup Signaling and Its RAN2 Impact, 3rd Generation Partnership Project (3GPP), Mobile Competence Centre, 650, Route Des Lucioles, F-06921 Sophia-Antipolis Cedex, France, vol. RAN WG2, No. Xi'an, China, Apr. 8, 2019-Apr. 12, 2019, Apr. 6, 2019 (Apr. 6, 2019), XP051700404, 8 Pages, p. 1-p. 7.

Qualcomm Incorporated: "PDCCH-Based Power Saving Channel Design", 3GPP Draft, R1-1912970, 3GPP TSG-RAN WG1 #99, 3rd Generation Partnership Project (3GPP), Mobile Competence Centre, 650, Route Des Lucioles, F-06921 Sophia-Antipolis Cedex, France, vol. RAN WG1, No. Reno. USA, Nov. 18, 2019-Nov. 22, 2019, Nov. 9, 2019 (Nov. 9, 2019), XP051823732, pp. 1-19.

Spreadtrum Communications: "Discussion on PDCCH-Based Power Saving Channel", R1-1912573, 3GPP TSG RAN WG1 Meeting #99, 3rd Generation Partnership Project, Mobile Competence Centre, 650, Route Des Lucioles, F-06921 Sophia-Antipolis Cedex, France vol. RAN WG1, No. Reno, USA, Nov. 18, 2019-Nov. 22, 2019, Nov. 8, 2019, XP051820094, 15 Pages, p. 1-13, Section 2.3, Section 2.1; p. 1-3; table 1, section 2.2; p. 3, section 2.3; p. 3-4, section 2.4; p. 4, section 2.5; p. 4-5, section 3.2; p. 6, section 4.2; p. 11.

Taiwan Search Report—TW109139690—TIPO—Mar. 19, 2024.

\* cited by examiner

CHANNEL STATE INFORMATION REPORTING OVER DISCONTINUOUS RECEPTION OPERATIONS

CROSS REFERENCE

The present Application is a Continuation of U.S. application Ser. No. 17/096,584, filed Nov. 12, 2020, which claims the benefit of U.S. Provisional Patent Application No. 62/937,104 by Damnjanovic et al., entitled "CHANNEL STATE INFORMATION REPORTING OVER DISCONTINUOUS RECEPTION OPERATIONS," filed Nov. 18, 2019, both of which are assigned to the assignee hereof and expressly incorporated by reference herein.

TECHNICAL FIELD

The following relates generally to wireless communications and more specifically to channel state information (CSI) reporting over discontinuous reception (DRX) operations.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices which may be otherwise known as user equipment (UEs). Some wireless communications systems, such as 4G and 5G systems, may support channel state information (CSI) operations and may also support discontinuous reception (DRX) operations. As demand for communication efficiency increases, some wireless communications systems, such as 4G and 5G systems, may fail to provide satisfactory CSI operations over DRX operations, and as a result, may be unable to support high reliability or low latency communications, among other examples.

SUMMARY

Various aspects of the described techniques relate to configuring a communication device, which may be a user equipment (UE), to support channel state information (CSI) operations (for example, CSI reporting) over discontinuous reception (DRX) operations in wireless communications systems. For example, the described techniques may be used to configure the communication device to transmit a CSI report irrespective of a wakeup signal in the DRX cycle. In some examples, the described techniques may facilitate configuring the communication device to transmit an indication for CSI reporting and to transmit the CSI report based on the indication. For example, the communication device may be configured to transmit the indication for the CSI reporting in an active duration of the DRX cycle. The communication device may be configured to transmit the CSI report in a separate active duration of the DRX cycle that is configured for use by the communication device to transmit the CSI report. Alternatively, the communication device may be configured to autonomously transmit a CSI report (for example, independent or regardless of the indication). As such, the communication device may be configured to support CSI operations over DRX operations irrespective of a wakeup signal, for example, in fifth generation (5G) systems, which may be referred to as New Radio (NR) systems. The described techniques may include features for improvements to power consumption and, in some examples, may promote enhanced efficiency for high reliability and low latency operations in 5G systems, among other benefits.

One inventive aspect of the subject matter described in this disclosure can be implemented in a method for wireless communication at a UE. The method may include monitoring a wakeup signal monitoring occasion in an inactive duration of a DRX cycle, determining an absence of a wakeup signal in the wakeup signal monitoring occasion based on monitoring the wakeup signal monitoring occasion, transmitting, in a first active duration of the DRX cycle, a CSI report on one or more resources based on the absence of the wakeup signal in the wakeup signal monitoring occasion, and receiving, in a second active duration of the DRX cycle, control information for the UE based on the CSI report.

Another inventive aspect of the subject matter described in this disclosure can be implemented in an apparatus for wireless communication at a UE. The apparatus may include a processor, memory coupled with the processor, and instructions stored in the memory. The instructions may be executable by the processor to cause the apparatus to monitor a wakeup signal monitoring occasion in an inactive duration of a DRX cycle, determine an absence of a wakeup signal in the wakeup signal monitoring occasion based on monitoring the wakeup signal monitoring occasion, transmit, in a first active duration of the DRX cycle, a CSI report on one or more resources based on the absence of the wakeup signal in the wakeup signal monitoring occasion, and receive, in a second active duration of the DRX cycle, control information for the apparatus based on the CSI report.

Another inventive aspect of the subject matter described in this disclosure can be implemented in an apparatus for wireless communication at a UE. The apparatus may include means for monitoring a wakeup signal monitoring occasion in an inactive duration of a DRX cycle, determining an absence of a wakeup signal in the wakeup signal monitoring occasion based on monitoring the wakeup signal monitoring occasion, transmitting, in a first active duration of the DRX cycle, a CSI report on one or more resources based on the absence of the wakeup signal in the wakeup signal monitoring occasion, and receiving, in a second active duration of the DRX cycle, control information for the apparatus based on the CSI report.

Another inventive aspect of the subject matter described in this disclosure can be implemented in a non-transitory computer-readable medium storing code for wireless communications at a UE. The code may include instructions executable by a processor to monitor a wakeup signal monitoring occasion in an inactive duration of a DRX cycle, determine an absence of a wakeup signal in the wakeup signal monitoring occasion based on monitoring the wakeup signal monitoring occasion, transmit, in a first active duration of the DRX cycle, a CSI report on one or more resources based on the absence of the wakeup signal in the wakeup signal monitoring occasion, and receive, in a second active duration of the DRX cycle, control information for the UE based on the CSI report.

Some examples of the method, apparatuses, and non-transitory computer-readable medium described herein may further include operations, features, means, or instructions for determining whether to monitor, in the second active duration of the DRX cycle, a downlink control channel for the control information for the UE based on the CSI report. In some examples, receiving the control information may be based on the determining.

Some examples of the method, apparatuses, and non-transitory computer-readable medium described herein may further include operations, features, means, or instructions for monitoring, in the second active duration of the DRX cycle, the downlink control channel for the control information for the UE based on determining whether to monitor the downlink control channel for the control information for the UE. In some examples, receiving the control information may be based on the monitoring of the downlink control channel.

Some examples of the method, apparatuses, and non-transitory computer-readable medium described herein may further include operations, features, means, or instructions for transmitting an indication that the UE requests reporting of the CSI report in the first active duration of the DRX cycle based on the absence of the wakeup signal in the wakeup signal monitoring occasion.

Some examples of the method, apparatuses, and non-transitory computer-readable medium described herein may further include operations, features, means, or instructions for receiving a message including a CSI reporting configuration, where transmitting the CSI report on the one or more resources includes autonomously transmitting the CSI report on the one or more resources based on the CSI reporting configuration.

Some examples of the method, apparatuses, and non-transitory computer-readable medium described herein may further include operations, features, means, or instructions for determining an absence of a wakeup signal for the UE in the wakeup signal monitoring occasion based on monitoring the wakeup signal monitoring occasion, where transmitting the CSI report may be based on the absence of the wakeup signal.

One inventive aspect of the subject matter described in this disclosure can be implemented in a method for wireless communication at a base station. The method may include receiving, in a first active duration of a DRX cycle, a CSI report on one or more resources and transmitting, in a second active duration of the DRX cycle, control information on a downlink control channel for a UE based on the CSI report.

Another inventive aspect of the subject matter described in this disclosure can be implemented in an apparatus for wireless communication. The apparatus may include a processor, memory coupled with the processor, and instructions stored in the memory. The instructions may be executable by the processor to cause the apparatus to receive, in a first active duration of a DRX cycle, a CSI report on one or more resources and transmit, in a second active duration of the DRX cycle, control information on a downlink control channel for a UE based on the CSI report.

Another inventive aspect of the subject matter described in this disclosure can be implemented in an apparatus for wireless communication. The apparatus may include means for receiving, in a first active duration of a DRX cycle, a CSI report on one or more resources and transmitting, in a second active duration of the DRX cycle, control information on a downlink control channel for a UE based on the CSI report.

Another inventive aspect of the subject matter described in this disclosure can be implemented in a non-transitory computer-readable medium storing code for wireless communication. The code may include instructions executable by a processor to receive, in a first active duration of a DRX cycle, a CSI report on one or more resources and transmit, in a second active duration of the DRX cycle, control information on a downlink control channel for a UE based on the CSI report.

DETAILED DESCRIPTION

Figure 1:
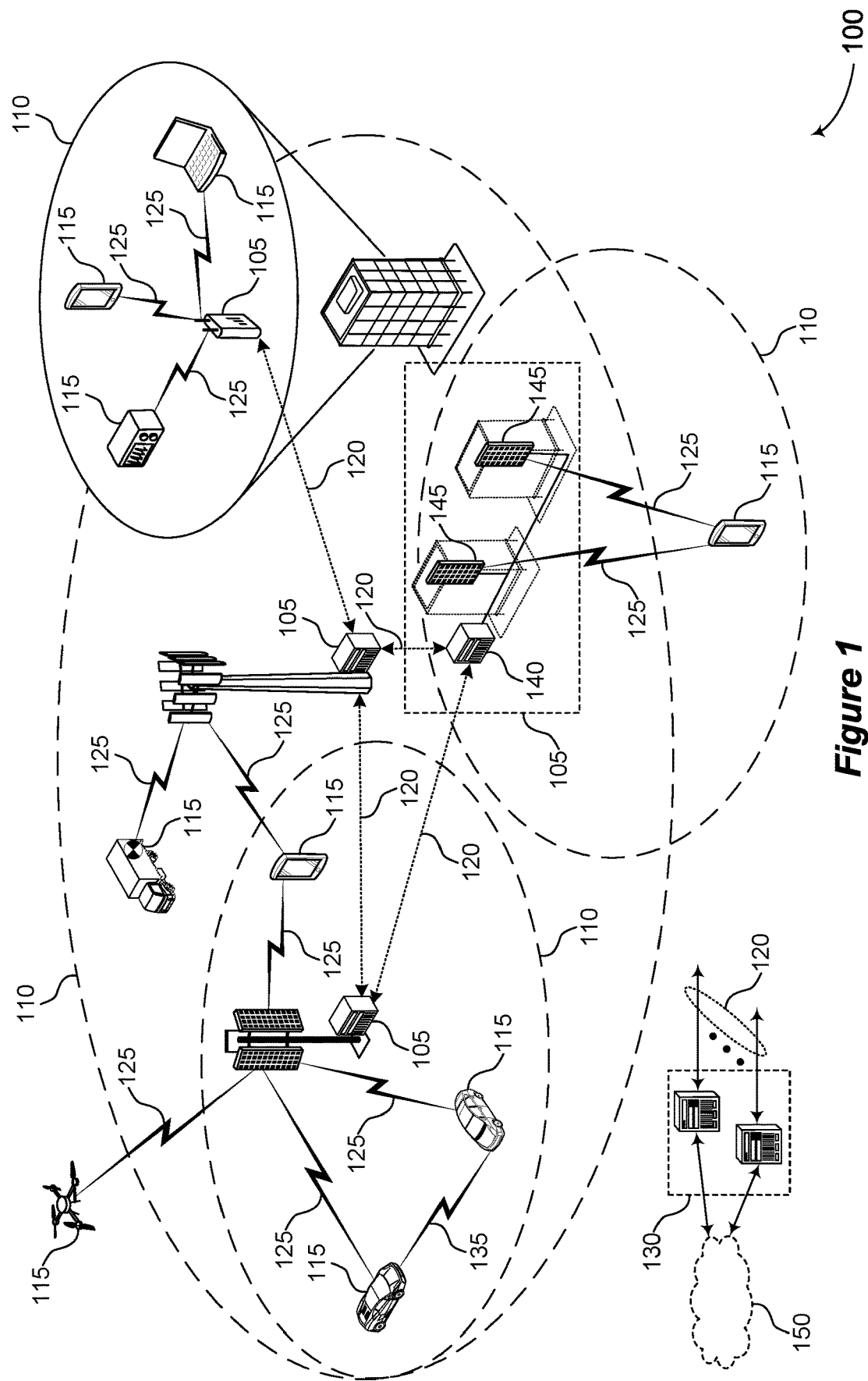
FIGS. 1 and 2 illustrate examples of wireless communications systems that support channel state information (CSI) reporting over discontinuous reception (DRX) operations in accordance with aspects of the present disclosure.

Wireless communications systems may include multiple communication devices such as user equipment (UEs) and base stations, which may provide wireless communication services to the UEs. For example, such base stations may be next-generation NodeBs or giga-NodeBs (either of which may be referred to as a gNB) that may support multiple radio access technologies (RATs) including fourth generation (4G) systems, such as Long Term Evolution (LTE) systems, as well as fifth generation (5G) systems, which may be referred to as New Radio (NR) systems. Some UEs may support channel state information (CSI) operations, such as CSI reporting. Some UEs may also support discontinuous reception (DRX) operations. In some examples, the UEs may be configured to measure reference signals transmitted by a base station and to provide CSI reports to the base station exclusively in an active duration of a DRX cycle. The UEs may be configured to support CSI operations, for example in an active duration of a DRX cycle, according to a wakeup signal configuration. Specifically, the UEs may be configured to transmit the CSI reports based on receiving a wakeup signal from the base station in an inactive duration of the DRX cycle.

For example, the UEs may be configured to monitor a pre-wakeup window (also referred to as a wakeup signal monitoring occasion) in an inactive duration of the DRX cycle to receive a wakeup signal. In some examples, if a UE receives a wakeup signal in the wakeup signal monitoring occasion and the wakeup signal indicates that the UE is to wake up, the UE may initiate an active duration of the DRX cycle. Additionally, if the UE is configured to perform CSI reporting in the active duration of the DRX cycle, the UE may transmit CSI reports on periodic or semi-persistent resources, configured by the base station, in the active duration of the DRX cycle. Otherwise, if the UE does not receive a wakeup signal in the wakeup signal monitoring occasion, the UE may elect to not power-on in the active duration of the DRX cycle. As such, the UE may not provide any CSI reports to the base station on the configured periodic or semi-persistent resources in the active duration of the DRX cycle.

As demand for communication efficiency increases, CSI reporting may be increasingly important for beam management, among other wireless operations. For example, CSI reporting may enable the maintenance or improvement of a beam link quality between the base station and the UE. Additionally, for UEs operating according to a wakeup signal configuration, it may be especially advantageous to maintain directional communication beams for receiving the wakeup signal to enable power saving, as well as for receiving control information and data with sufficient reliability and throughput. Existing wireless communications systems may fail to provide satisfactory CSI operations over DRX operations according to a wakeup configuration, and as a result, may be unable to support sufficient beam management, for example, for high reliability and low latency applications.

Various aspects of the described techniques relate to configuring a UE to support CSI operations, such as CSI reporting over DRX operations in 5G systems. For example, the described techniques may provide for a UE to monitor a wakeup signal monitoring occasion, and if the UE does not receive a wakeup signal, or if the UE is not indicated to wake up, the UE may transmit, to a base station, an indication that the UE requests CSI reporting in a first active duration of the respective DRX cycle. The base station may receive the indication and prepare to receive CSI reporting from the UE in the first active duration of the DRX cycle. As such, the UE may provide CSI reporting during the DRX cycle to improve reliability and throughput. In some aspects, the described CSI reporting techniques may be used to improve beam management in 5G systems. In some aspects, a base station may configure a UE to transmit the indication to the base station for CSI reporting. In some examples, the UE may be configured with persistent scheduled resources or semi-persistent scheduled resources on which the UE may transmit CSI reports. Alternatively, the UE may be configured to transmit the CSI reports autonomously (for example, without receiving a request or a trigger from the base station). The UE may be configured to transmit the indication for the CSI reporting in a duration of a DRX cycle. The duration may be part of an active duration of the DRX cycle or may be a separate active duration configured by the base station for the UE to transmit the indication. The UE may also be configured to transmit the CSI reports in a separate duration of the DRX cycle that may be part of an active duration of the DRX cycle or may be a separate active duration configured by the base station for the UE to transmit the CSI reports. The UE may, as a result, support CSI operations over DRX operations in 5G systems independent of a wakeup signal configuration.

Particular aspects of the subject matter described in this disclosure may be implemented to realize one or more of the following potential advantages, among others. The techniques employed by the UE may provide benefits and enhancements to the operation of the UE. For example, operations performed by the UE may provide improvements to directional communications when operating in 5G systems. By maintaining directional communication beams for receiving a wakeup signal, the UE may reduce power consumption by decreasing latency related to receiving the wakeup signal and, as a result, may also improve the reliability of the directional communications. Additionally or alternatively, configuring the UE to transmit a CSI report during a DRX operation may provide improvements to beam management for the UE. For example, by configuring the UE to transmit an indication that the UE requests CSI reporting in an active duration of a DRX cycle may provide for enhanced CSI operations compared to some wireless communications systems in which CSI operations over DRX operations may be unsatisfactory. The indication that the UE requests CSI reporting in an active duration of a DRX cycle may improve CSI reporting in the DRX cycle by decreasing latency related to CSI reporting, and thereby promote enhanced efficiency for directional communications between the UE and a base station. Additionally, or alternatively, configuring the UE to transmit CSI reporting during an active duration regardless of whether the UE receives an indication to wakeup may support CSI reporting efficiency. The improvements to the CSI reporting efficiency may promote improved spectral efficiency and higher data rates. The described techniques may thereby promote enhanced efficiency and throughput for beam operations in wireless communications systems, among other benefits.

Aspects of the disclosure are initially described in the context of wireless communications systems. Aspects of the disclosure are then illustrated by and described with references to timelines that relate to CSI reporting over DRX operations. Aspects of the disclosure are further illustrated by and described with reference to apparatus diagrams, system diagrams, and flowcharts that relate to channel state information reporting over discontinuous reception operations.

FIG. 1 illustrates an example of a wireless communications system 100 that supports CSI reporting over DRX operations in accordance with aspects of the present disclosure. The wireless communications system 100 may include one or more base stations 105, one or more UEs 115, and a core network 130. In some examples, the wireless communications system 100 may be a LTE network, an LTE-Advanced (LTE-A) network, an LTE-A Pro network, or a NR network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol duration (for example, a duration of one modulation symbol) and one subcarrier, where the symbol duration and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling duration of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol durations (for example, depending on the length of the cyclic prefix prepended to each symbol duration). In some wireless communications systems 100, a slot may further be divided into multiple mini-slots containing one or more symbols. Excluding the cyclic prefix, each symbol duration may contain one or more (for example, $N_f$) sampling durations. The duration of a symbol duration may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol durations in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol durations and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other examples, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for determining a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, where the device may provide HARQ feedback in a specific slot for data received in a previous symbol in the slot. In other examples, the device may provide HARQ feedback in a subsequent slot, or according to some other time interval.

Figure 2:
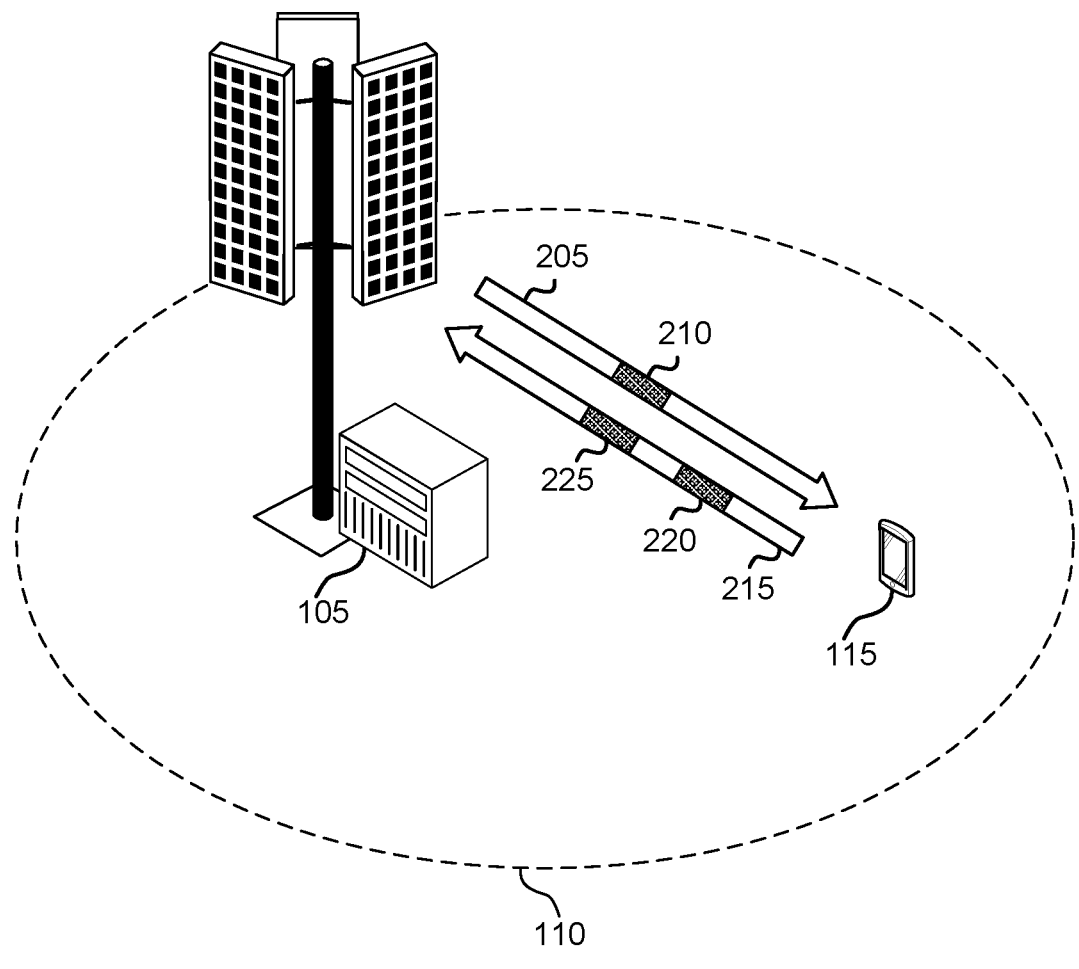

FIG. 2 illustrates an example of a wireless communications system 200 that supports CSI reporting over DRX operations in accordance with aspects of the present disclosure. In some examples, the wireless communications system 200 may implement aspects of the wireless communications system 100. For example, the wireless communications system 200 may include a base station 105 and a UE 115 within a geographic coverage area 110. The base station 105 and the UE 115 may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote enhanced efficiency for high reliability and low latency CSI reporting over DRX operations, among other benefits.

The base station 105 and the UE 115 may be configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming. For example, the base station 105 antennas or antenna arrays may be co-located at an antenna assembly, such as an antenna tower. In some examples, antennas or antenna arrays associated with the base station 105 may be located in diverse geographic locations. The base station 105 may have an antenna array with a number of rows and columns of antenna ports that the base station 105 may use to support beamforming of communications with the UE 115. Likewise, the UE 115 may have one or more antenna arrays that may support various multiple-input multiple-output or beamforming operations. Additionally or alternatively, an antenna panel may support radio frequency beamforming for a signal transmitted via one or more antenna ports. The base station 105 and the UE 115 may thus be configured to support directional communications using the multiple antennas.

The UE 115, in the wireless communications system 200, may support various radio resource control (RRC) modes to preserve resources (for example, time and frequency resources of the wireless communications system 200), a battery life of the UE 115, among other examples. An RRC mode may include one or more of an RRC connected mode, an RRC idle mode, or an RRC inactive mode. In the RRC connected mode, the UE 115 may have an active connection with the base station 105 and operate according to a first power mode (for example, a normal power mode). In the RRC inactive mode, the UE 115 may also have an active connection with the base station 105 but may operate according to a second power mode (for example, a low power mode). In the RRC idle mode the UE 115 may not have an active connection with the base station 105 and thus may operate according to a third power mode (for example, a lower power mode compared to the RRC inactive mode).

The UE 115 may be configured to support DRX operations for directional communications using the multiple antennas while operating in an RRC mode (for example, an RRC inactive mode). For example, in the RRC connected mode, DRX operations can yield power savings by allowing the UE 115 to power down for one or more durations, as directed by the base station 105. In the RRC idle mode or in the RRC inactive mode, DRX operations can be used to further extend the time the UE 115 spends in a lower power mode. DRX operations therefore offer improvement on resource utilization as well as power saving for the UE 115. In some examples, the UE 115 may be configured to also support CSI operations to further offer improvement to power savings and operations for the UE 115. For example, the UE 115 may be configured to support CSI operations to manage or improve directional communications between the base station 105 and the UE 115.

The operations performed by the base station 105 and the UE 115, for example, may provide improvements to directional operations in the wireless communications system 200. Furthermore, the operations performed by the base station 105 and the UE 115 may provide benefits and enhancements to the operation of the UE 115. For example, by supporting CSI reporting over DRX operations in the wireless communications system 200, various operational characteristics, such as power consumption, may be reduced. The operations performed by the base station 105 and the UE 115 may also promote efficiency of the UE 115 by reducing latency associated with processes related to high reliability and low latency directional communications operations (such as, beam management operations).

Figure 3:
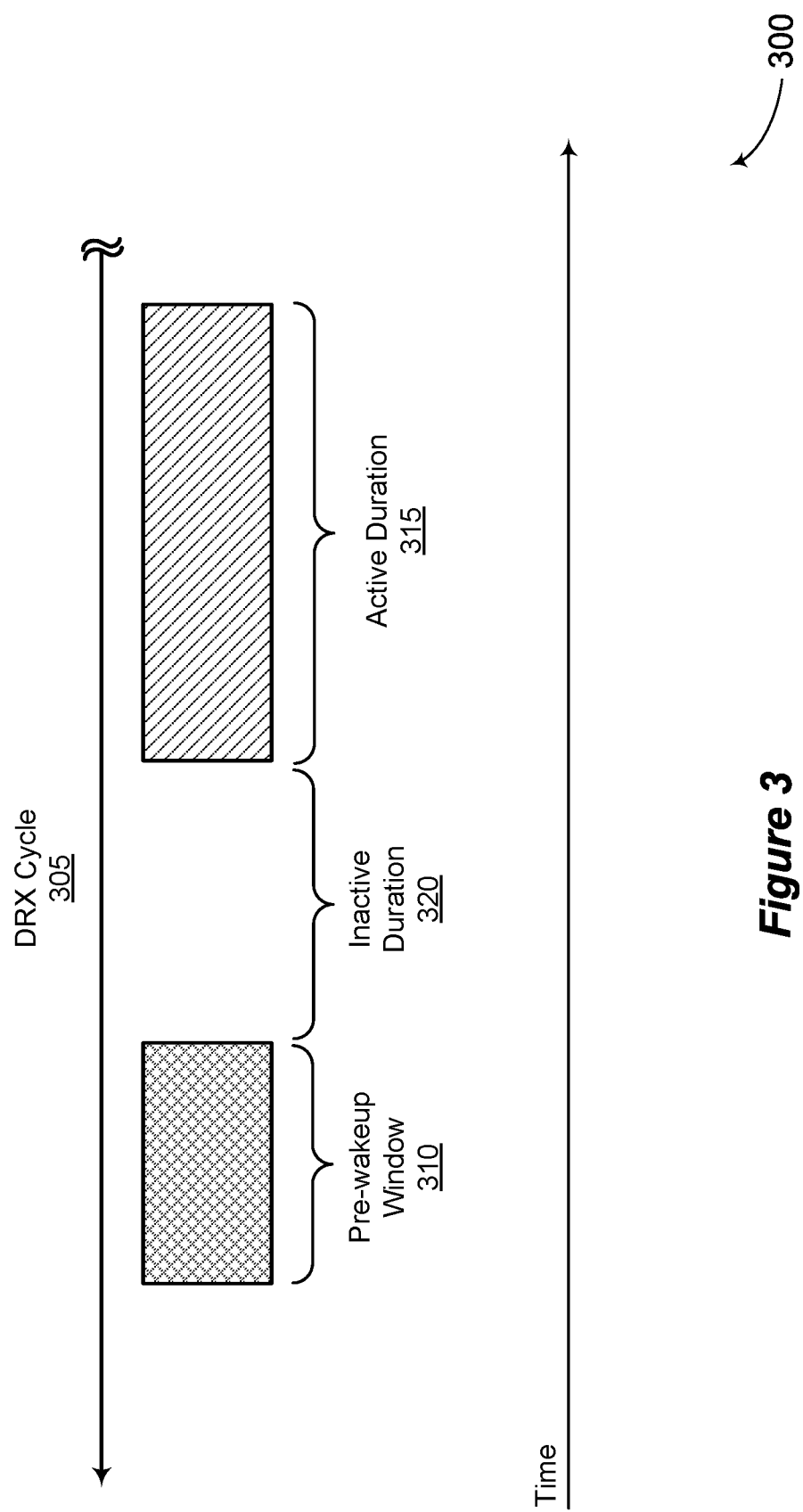
FIGS. 3 and 4 illustrate examples of timelines that support CSI reporting over DRX operations in accordance with aspects of the present disclosure.

FIG. 3 illustrates an example of a timeline 300 that supports CSI reporting over DRX operations in accordance with aspects of the present disclosure. In some examples, the timeline 300 may also implement aspects of the wireless communications system 100 and 200, as described with reference to FIGS. 1 and 2. For example, the timeline 300 may be based on a configuration by a base station 105 or a UE 115 and may be implemented by the UE 115. In the example illustrated in FIG. 3, the timeline 300 is applicable to implementations or instances when the UE 115 is configured with CSI operation capability over DRX operations in 5G systems.

The timeline 300 may include a DRX cycle 305, which may correspond to time resources (for example, a symbol duration, a slot duration, a subframe duration, a frame duration), as well as frequency resources (for example, subcarriers, carriers). The timeline 300 may also include a pre-wakeup window 310 (also referred to as a wakeup signal monitoring occasion) and an active duration 315 (also referred to as a DRX ON duration). The pre-wakeup window 310, or the active duration 315, or both may also correspond to time and frequency resources. For example, the pre-wakeup window 310 and the active duration 315 may correspond to a number of subframe cycles, with each subframe in a cycle having a subframe index, that may, for example, range from 0 to 9. Each subframe cycle or subframe index or both may relate to one or more symbols and subcarriers.

With reference to FIGS. 1 and 2, the base station 105 may configure the UE 115 with a pre-wakeup window to preserve resources (for example, time and frequency resources). Under DRX operations, the UE 115 may be configured to monitor the pre-wakeup window of a DRX cycle. In some examples, the UE 115 may be configured to monitor the pre-wakeup window of the DRX cycle when in a first mode, such as an RRC mode. For example, with reference to FIGS. 1 and 2, and in accordance with the timeline 300, a UE 115 may monitor the pre-wakeup window 310 over the DRX cycle 305. In some examples, the pre-wakeup window 310 may be part of the DRX cycle 305 to preserve resources (for example, time and frequency resources) or a battery life of the UE 115, among other advantages. For example, the pre-wakeup window 310 may facilitate power saving advantages of the UE 115 by reducing unnecessary wakeup occasions for the UE 115.

While monitoring the pre-wakeup window 310 in the DRX cycle 305, the UE 115 may receive, from a base station 105, a wakeup signal that may carry an indication of an active duration 315 of the DRX cycle 305 for the UE 115. For example, with reference to FIGS. 1 and 2, the base station 105 may transmit, to the UE 115, a wakeup signal 210 in the pre-wakeup window via the one or more directional beams 205 (for example, downlink directional beams). The UE 115 may receive the wakeup signal 210 in the pre-wakeup window via the one or more directional beams 205 (for example, downlink directional beams). The wakeup signal 210 may indicate whether the UE 115 has to wake up for a duration of a DRX cycle. For example, the wakeup signal 210 may provide an indication for the UE 115 to wake up in the active duration 315 associated with the DRX cycle 305 to receive directional communications, for example, control information, or data, or both from the base station 105.

With reference to FIGS. 1 and 2, and in accordance with the timeline 300, the base station 105 may not transmit, in the pre-wakeup window 310, the wakeup signal 210 to the UE 115 via the one or more directional beams 205 (for example, downlink directional beams). Here, the UE 115 may refrain from powering on in the active duration 315 of the DRX cycle 305 because the absence of the wakeup signal 210 may be an indication to the UE 115 that there are no upcoming communications (for example, control information or data, or both) from the base station 105, and thereby the UE 115 may experience power savings.

For example, the UE 115 may not monitor a downlink control channel (for example, a physical downlink control channel (PDCCH)) in the active duration 315. In other words, the UE 115 may exclusively monitor a downlink control channel (for example, a PDCCH) in the active duration 315 when the UE 115 receives a wakeup signal (for example, the wakeup signal 210). Otherwise, the active duration 315 can be skipped. The DRX cycle 305 may include an inactive duration (also referred to an offset) between the pre-wakeup window 310 and the active duration 315. While in the inactive duration 320, the UE 115 may enter a low power mode, and thereby further reduce power consumption. The UE 115 may exit the low power mode in the active duration 315 of the DRX cycle 305. In some examples, the UE 115 may enter a low power mode when skipping the active duration 315, and thereby further reduce power consumption.

In some examples, the UE 115 may be configured to support CSI operations to further offer improvement to power savings and operations for the UE 115, as well as for managing directional communications between the base station 105 and the UE 115. For example, the base station 105 may transmit a reference signal (for example, a CRS, a CSI reference signal (CSI-RS)). The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by the base station 105, the UE 115 may employ similar techniques for transmitting signals multiple times in different directions (for example, for determining a beam direction for subsequent transmission or reception by the UE 115) or for transmitting a signal in a single direction (for example, for transmitting data to a receiving device).

In some examples, the UE 115 may be configured to measure the reference signal and provide a CSI report exclusively in an active duration of a DRX cycle. For example, the UE 115 may be configured to provide the CSI report exclusively in the active duration 315 of the DRX cycle 305. In some other examples, the UE 115 may be configured to support CSI operations according to a wakeup signal configuration. That is, the UE 115 may be configured to transmit a CSI report based on a reception of a wakeup signal (such as, the wakeup signal 210) in a DRX cycle. For example, if the UE 115 is configured to provide a CSI report, the UE 115 may transmit the CSI report on configured periodic or semi-persistent resources in the active duration 315 of the DRX cycle 305, based on a reception of the wakeup signal 210. Otherwise, if the UE 115 does not receive the wakeup signal 210 (for example, in the pre-wakeup window 310), the UE 115 may not power on in the active duration 315 of the DRX cycle 305 to transmit CSI reports. As such, the UE 115 does not provide any CSI reports on the configured periodic or semi-persistent resources in the active duration 315 of the DRX cycle 305.

As demand for communication efficiency increases, CSI reports may be important for beam management (for example, for the directional beams 205 or directional beams 215, or both). For example, the CSI reports may be important to maintain or improve a beam link quality between the base station 105 and the UE 115. In some examples, when the UE 115 is configured to operate according the wakeup signal configuration, maintaining directional communication beams for the wakeup signal 210 may be important for power saving and reliability for the base station 105 and the UE 115. In addition, maintaining the directional communication beams for the base station 105 and the UE 115 may be important for receiving control information and data to improve reliability and throughput for the base station 105 and the UE 115.

The base station 105 may configure the UE 115 to transmit an indication (also referred to as a CSI report request 220) for CSI reporting (for example, to transmit a CSI report 225). In some examples, the base station 105 may configure the UE 115 with persistent scheduled resources or semi-persistent scheduled resources on which the UE 115 may transmit the CSI report 225. Alternatively, base station 105 may configure the UE 115 to transmit the CSI report 225 autonomously (for example, without receiving a request or a trigger from another communication device). To support these operations, base station 105 may configure the UE 115 to transmit the CSI report request 220 for the CSI reporting in a duration of a DRX cycle. An example timeline for CSI reporting over DRX operations is described with reference to FIG. 4 herein.

Figure 4:
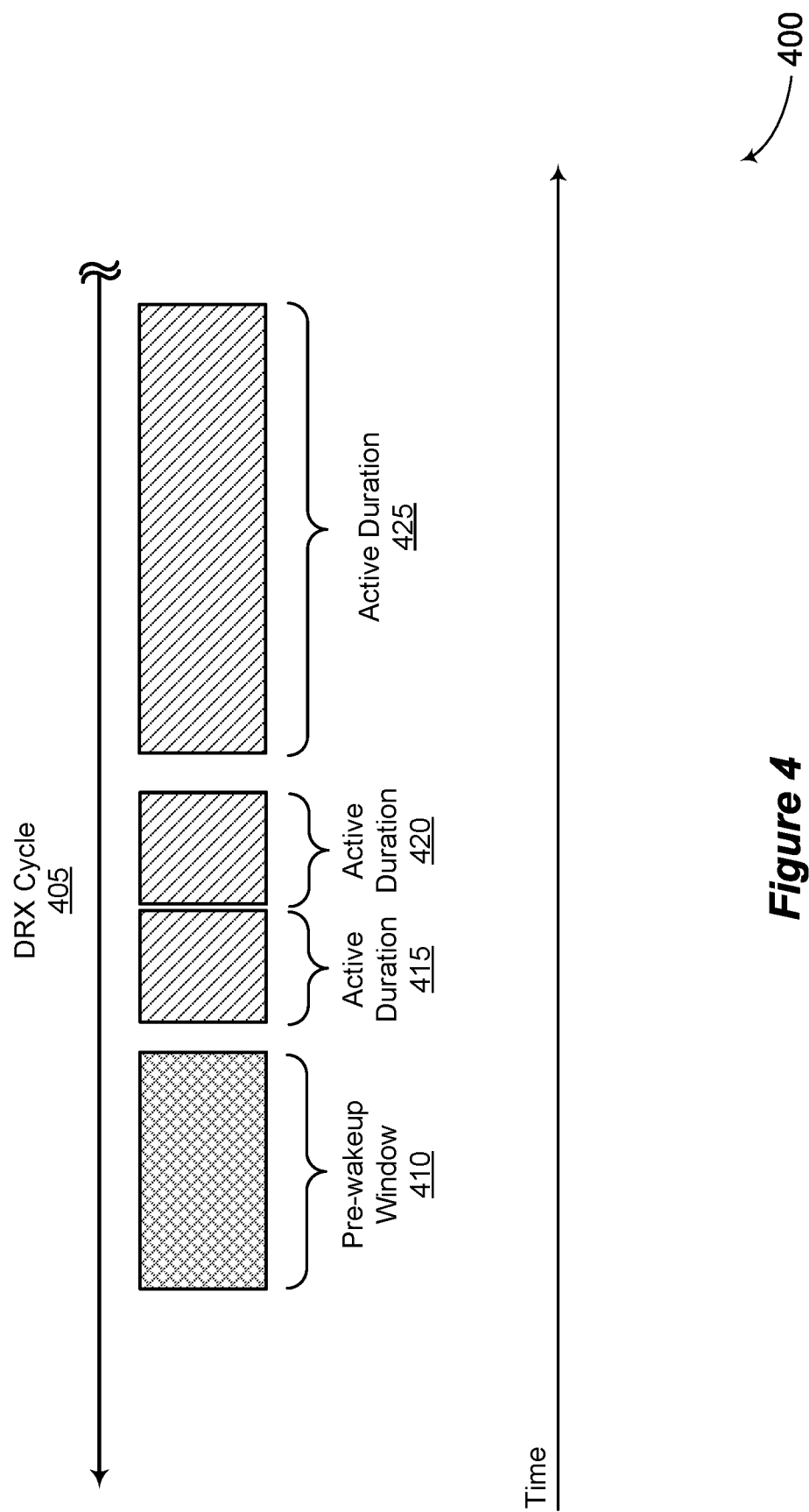

FIG. 4 illustrates an example of a timeline 400 that supports CSI reporting over DRX operations in accordance with aspects of the present disclosure. In some examples, the timeline 400 may also implement aspects of the wireless communications system 100 and 200, as described with reference to FIGS. 1 and 2. For example, the timeline 400 may be based on a configuration by a base station 105 or a UE 115, and may be implemented by the UE 115. In the example illustrated in FIG. 4, the timeline 400 is applicable to implementations or instances when the UE 115 is configured with CSI operation capability over DRX operations in 5G systems.

The timeline 400 may include a DRX cycle 405, which may correspond to time resources (for example, a symbol duration, a slot duration, a subframe duration, a frame duration), as well as frequency resources (for example, subcarriers, carriers). The timeline 400 may also include a pre-wakeup window 410 and a number of active durations, such as an active duration 415, an active duration 420, and an active duration 425. The pre-wakeup window 410, the active duration 415, the active duration 420, the active duration 425, or any combination thereof may also correspond to time and frequency resources. For example, the pre-wakeup window 410, the active duration 415, the active duration 420, the active duration 425, or any combination thereof may correspond to a number of subframe cycles, with each subframe in a cycle having a subframe index ranging from 0 to 9. Each subframe cycle or subframe index or both may relate to one or more symbols and subcarriers.

In the example of FIG. 4, one or more of the active duration 415, the active duration 420, and the active duration 425 may be contiguous in the DRX cycle 405. Alternatively, one or more of the active duration 415, the active duration 420, and the active duration 425 may be noncontiguous in the DRX cycle 405. In some examples, one or more of the active duration 415, the active duration 420, and the active duration 425 may be part of a same active duration of the DRX cycle 405. That is, one or more of the active duration 415, the active duration 420, and the active duration 425 may form a single active duration of the DRX cycle 405.

The base station 105, as described with reference to FIG. 2, may configure the UE 115 with a pre-wakeup window to preserve resources (for example, time and frequency resources). In some examples, the pre-wakeup window may be referred to as a wakeup signal monitoring occasion. Under some DRX operations, the UE 115 may be configured to monitor the pre-wakeup window of a DRX cycle. In some examples, the UE 115 may be configured to monitor the pre-wakeup window of the DRX cycle when in an RRC mode. For example, with reference to FIGS. 1 and 2, and in accordance with the timeline 400, a UE 115 may monitor the pre-wakeup window 410 over the DRX cycle 405. In some examples, the pre-wakeup window 410 may be part of the DRX cycle 405 to preserve resources (for example, time and frequency resources) or a battery life of the UE 115. For example, the pre-wakeup window 410 may provision the UE 115 with power saving advantages by reducing unnecessary wakeup occasions for the UE 115.

With reference to FIG. 2, and in accordance with the timeline 400, the base station 105 may configure the UE 115 by transmitting a configuration message via one or more directional beams 205 (for example, downlink directional beams). The configuration message may include a configuration of a pre-wakeup window 410 associated with directional communications. In some examples, the configuration message may be an RRC configuration message. While in the RRC connected mode, the UE 115 may receive the configuration message via the one or more directional beams 205 (for example, downlink directional beams). The base station 105 may enable the UE 115 to power on and monitor the pre-wakeup window 410 over an inactive duration of a DRX cycle 405 based on configuration information carried in the RRC configuration message.

While monitoring the pre-wakeup window 410 in the DRX cycle 405, the UE 115 may receive, from the base station 105, a wakeup signal. For example, with reference to FIGS. 1 and 2, the base station 105 may transmit, to the UE 115, a wakeup signal 210 in the pre-wakeup window 410 via the one or more directional beams 205 (for example, downlink directional beams). The UE 115 may receive the wakeup signal 210 in the pre-wakeup window 410 via the one or more directional beams 205 (for example, downlink directional beams). The wakeup signal 210 may indicate whether the UE 115 has to wake up for a duration of the DRX cycle 405. For example, the wakeup signal 210 may provide an indication for the UE 115 to wake up in the active duration 425 associated with the DRX cycle 405 to receive directional communications, for example, control information or data, or both from the base station 105.

With reference to FIG. 2, and in accordance with the timeline 400, the base station 105 may not transmit, in the pre-wakeup window 410, the wakeup signal 210 to the UE 115 via the one or more directional beams 205 (for example, downlink directional beams). In the example of FIG. 4, the UE 115 may be configured to support CSI operations to further offer improvements to power savings and operations for the UE 115, as well as for managing directional communications between the base station 105 and the UE 115. In some examples, because the UE 115 did not receive the wakeup signal in the pre-wakeup window 410, the UE 115 may be unable to transmit a CSI report (for example, the CSI report 225) to the base station 105.

In accordance with the timeline 400, the UE 115 may be configured to transmit an indication (for example, the CSI report request 220) for CSI reporting (for example, to transmit the CSI report 225) irrespective of the wakeup signal 210. In some examples, the base station 105 may configure the UE 115 with persistent scheduled resources or semi-persistent scheduled resources on which the UE 115 may transmit the CSI report 225. Alternatively, base station 105 may configure the UE 115 to transmit the CSI report 225 autonomously (for example, without receiving a request or a trigger from another communication device). Therefore, to support these operations, base station 105 may configure the UE 115 to support CSI reporting in a duration of a DRX cycle irrespective of wakeup signaling.

The UE 115 may transmit, in the active duration 420 of the DRX cycle 405, a CSI report (for example, the CSI report 225) on one or more resources based on monitoring the pre-wakeup window 410. The UE 115 may measure one or more CSI reference signals in the active duration 420 of the DRX cycle 405 and determine CSI based on the measuring. The UE 115 may transmit the CSI in the CSI report (for example, the CSI report 225) based on the CSI satisfying a threshold. In some examples, the CSI may include a channel quality indication or a layer one reference signal received power (L1-RSRP). The UE 115 may thus transmit the CSI report when the channel quality indication or the L1-RSRP, or both satisfy a threshold.

In some examples, the base station 105 may transmit, and the UE 115 may receive, a message including CSI reporting configuration (for example, an RRC configuration message). The UE 115 may autonomously transmit, in the active duration 420 of the DRX cycle 405, a CSI report (for example, the CSI report 225) on one or more resources based on the CSI reporting configuration. For example, with reference to FIGS. 2 and 4, the UE 115 may transmit, in the active duration 420 of the DRX cycle 405, a CSI report (for example, the CSI report 225) on one or more resources independent of receiving the wakeup signal 210 in the pre-wakeup window 410. The one or more resources may be one or more persistent scheduled resources or one or more semi-persistent scheduled resources. When the UE 115 perform autonomous reporting, the base station 105 may have to blindly monitor the one or more resources to receive the CSI report from the UE 115.

The base station 105 may transmit, and the UE 115 may receive, a message including a configuration (for example, an RRC configuration message) associated with a CSI report count. The UE 115 may determine the CSI report count based on the configuration. The UE may thus, in some examples, transmit, in the active duration 420 of the DRX cycle 405, the CSI report (for example, the CSI report 225) on one or more resources based on the CSI report count. In some examples, the UE 115 may refrain from transmitting, in the active duration 420 of the DRX cycle 405, the CSI report (for example, the CSI report 225) on one or more resources based on the CSI report count satisfying a threshold. As a result, the UE 115 may store and transmit the CSI report in a subsequent DRX cycle.

In some examples, the UE 115 may be configured to transmit, in the active duration 415 of the DRX cycle 405, an indication (for example, the CSI report request 220) that the UE 115 requests CSI reporting. In other words, the UE 115 may signal the base station 105 that the UE 115 requests CSI reporting. In response, the base station 105 may prepare for receiving a CSI report (for example, the CSI report 225) from the UE 115. In some examples, the base station 105 may transmit, and the UE 115 may receive, a message including a configuration (for example, an RRC configuration message) indicating one or more resources of an uplink channel for transmitting the indication that the UE 115 requests CSI reporting. The uplink channel may be a physical uplink control channel (PUCCH).

The UE 115 may thus transmit, in the active duration 415 of the DRX cycle 405, an indication (for example, the CSI report request 220) that the UE 115 requests CSI reporting. For example, the UE 115 may transmit the indication on one or more resources of the uplink channel. In some examples, the one or more resources of the uplink channel for the indication that the UE 115 requests CSI reporting correspond to one or more scheduling request (SR) resources. In some examples, the base station 105 or the UE 115, or both may be configured to repurpose some resources or channels for CSI reporting. For example, an SR resource within a configured active duration may be implicitly re-purposed for the CSI reporting indication.

In some examples, the UE 115 may be configured to initiate (for example, activate or enable) a CSI reporting timer based on transmitting, in the active duration 415 of the DRX cycle 405, an indication (for example, the CSI report request 220) that the UE 115 requests CSI reporting. In some examples, the base station 105 may transmit, and the UE 115 may receive, a timer configuration corresponding to the CSI reporting timer. The UE 115 may initiate the CSI reporting timer based on the timer configuration. In some examples, the length of the active duration 420 of the DRX cycle 405 may correspond to the CSI reporting timer. For example, the UE 115 may transmit, in the active duration 420 of the DRX cycle 405, a CSI report (for example, the CSI report 225) based on the CSI reporting timer (for example, before the CSI reporting timer lapses).

Thus, the active duration 420 of the DRX cycle 405 may correspond to a configured number of CSI reporting after the indication. The UE 115 may thus provide all CSI reporting over the configured active duration 420. In some examples, the UE 115 may provide all CSI reporting until a timer expires (for example, the CSI reporting timer). The timer may be configured by the base station 105 and activated after the UE 115 transmits the indication. In some other examples, the UE 115 may provide CSI reporting according to a number and reporting occasion determined by configured event. For example, the UE 115 may be configured to report CSI when the measured CSI (for example, a channel quality indicator or an L1-RSRP, or both) is under or above a threshold.

The UE 115 may, in some examples, determine whether to monitor, in the active duration 425 of the DRX cycle 405, a downlink control channel for the control information (for example, a beam update command) for the UE 115 based on the CSI report. The UE 115 may monitor, in the active duration 425 of the DRX cycle 405, the downlink control channel (for example, a PDCCH) for the control information for the UE 115 based on determining whether to monitor the downlink control channel for the control information for the UE 115. Alternatively, the UE 115 may refrain from monitoring, in the active duration 425 of the DRX cycle 405, the downlink control channel (for example, a PDCCH) for the control information for the UE 115. The base station 105 may transmit, and the UE 115 may receive, a message including a downlink channel timer configuration. The UE 115 may initiate a downlink channel timer based on transmitting the CSI report, in the active duration 420 of the DRX cycle 405, and may monitor, in the active duration 425 of the DRX cycle 405 a downlink control channel for the control information for the UE 115 based on the downlink channel timer.

The active duration 425 of the DRX cycle 405 may be a duration after CSI reporting to an ending of the DRX cycle 405. In some examples, the active duration 425 of the DRX cycle 405 may be a duration after CSI reporting and until a CSI reporting timer expires. The CSI reporting timer may be configured by the base station 105 and may be activated by the UE 115 after the UE 115 transmits the CSI report. In some examples, the active duration 425 of the DRX cycle 405 may be a zero-duration (in other words, there may be no active duration 425 in the DRX cycle 405) and the UE 115 may not preform PDCCH monitoring after the CSI reporting. In this example, if the base station 105 transmits control information (for example, for beam update) via PDCCH to improve directional communications between the base station 105 and the UE 115, the base station 105 may transmit (for example, retransmit) a wakeup signal to the UE 115 at a next DRX cycle, so that the UE may monitor the PDCCH and receive the control information.

In some examples, the UE 115 may receive, in the active duration 425 of the DRX cycle 405, control information for the UE 115 based on the transmitted CSI report in the active duration 415. For example, the UE 115 may determine a beam operation for one or more directional beams of the UE 115 based on the control information. The beam operation may be a beam update operation for the one or more directional beams 215 associated with the UE 115. The UE 115 may update one or more parameters for the one or more directional beams 215 based on the beam update operation, and communicate using the one or more directional beams according to the updated parameters.

The operations performed by the base station 105 and the UE 115, for example, may provide improvements to directional operations in the wireless communications system 200. Furthermore, the operations performed by the base station 105 and the UE 115 may provide benefits and enhancements to the operation of the UE 115. For example, by supporting CSI reporting over DRX operations in the wireless communications system 200, the operational characteristics, such as power consumption may be reduced. The operations performed by the base station 105 and the UE 115 may also provide efficiency to the UE 115 by reducing latency associated with processes related to high reliability and low latency directional communications operations (such as, beam management operations).

Figure 5:
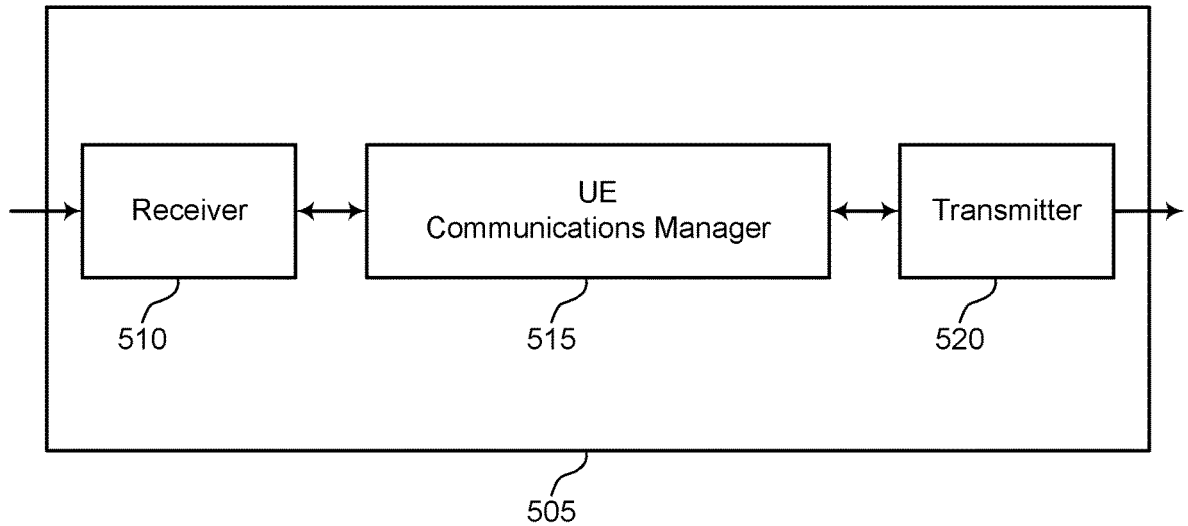
FIGS. 5 and 6 show block diagrams of devices that support CSI reporting over DRX operations in accordance with aspects of the present disclosure.

FIG. 5 shows a block diagram of a device 505 that supports CSI reporting over DRX operations in accordance with aspects of the present disclosure. The device 505 may be an example of aspects of a UE 115 as described herein. The device 505 may include a receiver 510, a UE communications manager 515, and a transmitter 520. The UE communications manager 515 can be implemented, at least in part, by one or both of a modem and a processor. Each of these components may be in communication with one another (for example, via one or more buses).

The receiver 510 may receive information such as packets, user data, or control information associated with various information channels (for example, control channels, data channels, and information related to CSI reporting over DRX operations). Information may be passed on to other components of the device 505. The receiver 510 may be an example of aspects of the transceiver 820 described with reference to FIG. 8. The receiver 510 may utilize a single antenna or a set of antennas.

The UE communications manager 515 may monitor a wakeup signal monitoring occasion in an inactive duration of a DRX cycle, determine an absence of a wakeup signal for the UE in the wakeup signal monitoring occasion based on monitoring the wakeup signal monitoring occasion, transmit, in a first active duration of the DRX cycle, a CSI report on one or more resources based on the absence of the wakeup signal in the wakeup signal monitoring occasion, and receive, in a second active duration of the DRX cycle, control information for the UE based on the CSI report.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

Figure 6:
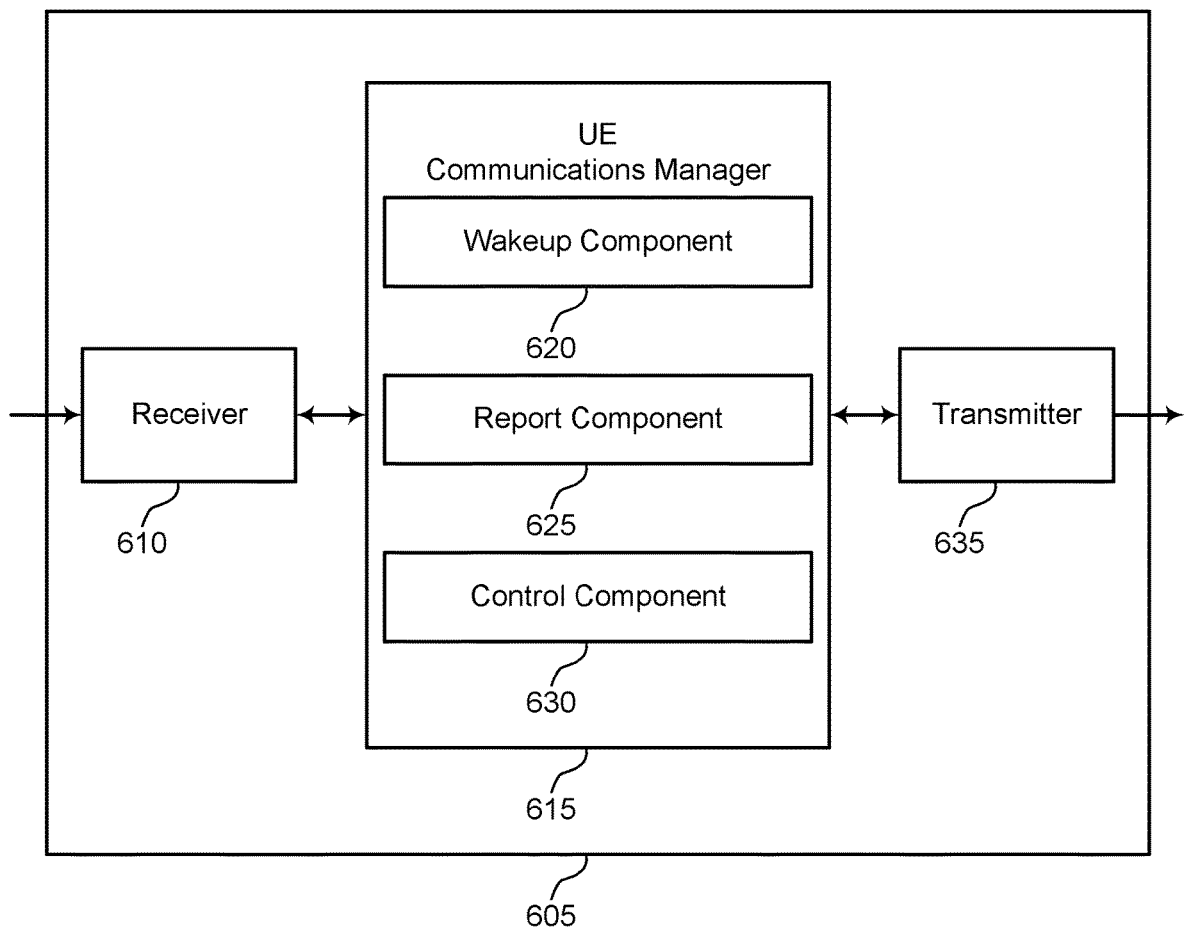

FIG. 6 shows a block diagram of a device 605 that supports CSI reporting over DRX operations in accordance with aspects of the present disclosure. The device 605 may be an example of aspects of a device 505, or a UE 115 as described herein. The device 605 may include a receiver 610, a UE communications manager 615, and a transmitter 635. The UE communications manager 615 can be implemented, at least in part, by one or both of a modem and a processor. Each of these components may be in communication with one another (for example, via one or more buses).

The receiver 610 may receive information such as packets, user data, or control information associated with various information channels (for example, control channels, data channels, and information related to CSI reporting over DRX operations). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a wakeup component 620, a report component 625, and a control component 630. The UE communications manager 615 may be an example of aspects of the UE communications manager 810 described herein.

The wakeup component 620 may monitor a wakeup signal monitoring occasion in an inactive duration of a DRX cycle. The wakeup component 620 may determine an absence of a wakeup signal for the UE in the wakeup signal monitoring occasion based on monitoring the wakeup signal monitoring occasion. The report component 625 may transmit, in a first active duration of the DRX cycle, a CSI report on one or more resources based on the absence of the wakeup signal in the wakeup signal monitoring occasion. The control component 630 may receive, in a second active duration of the DRX cycle, control information for the UE based on the CSI report.

The transmitter 635 may transmit signals generated by other components of the device 605. In some examples, the transmitter 635 may be collocated with a receiver 610 in a transceiver component. For example, the transmitter 635 may be an example of aspects of the transceiver 820 described with reference to FIG. 8. The transmitter 635 may utilize a single antenna or a set of antennas.

Figure 7:
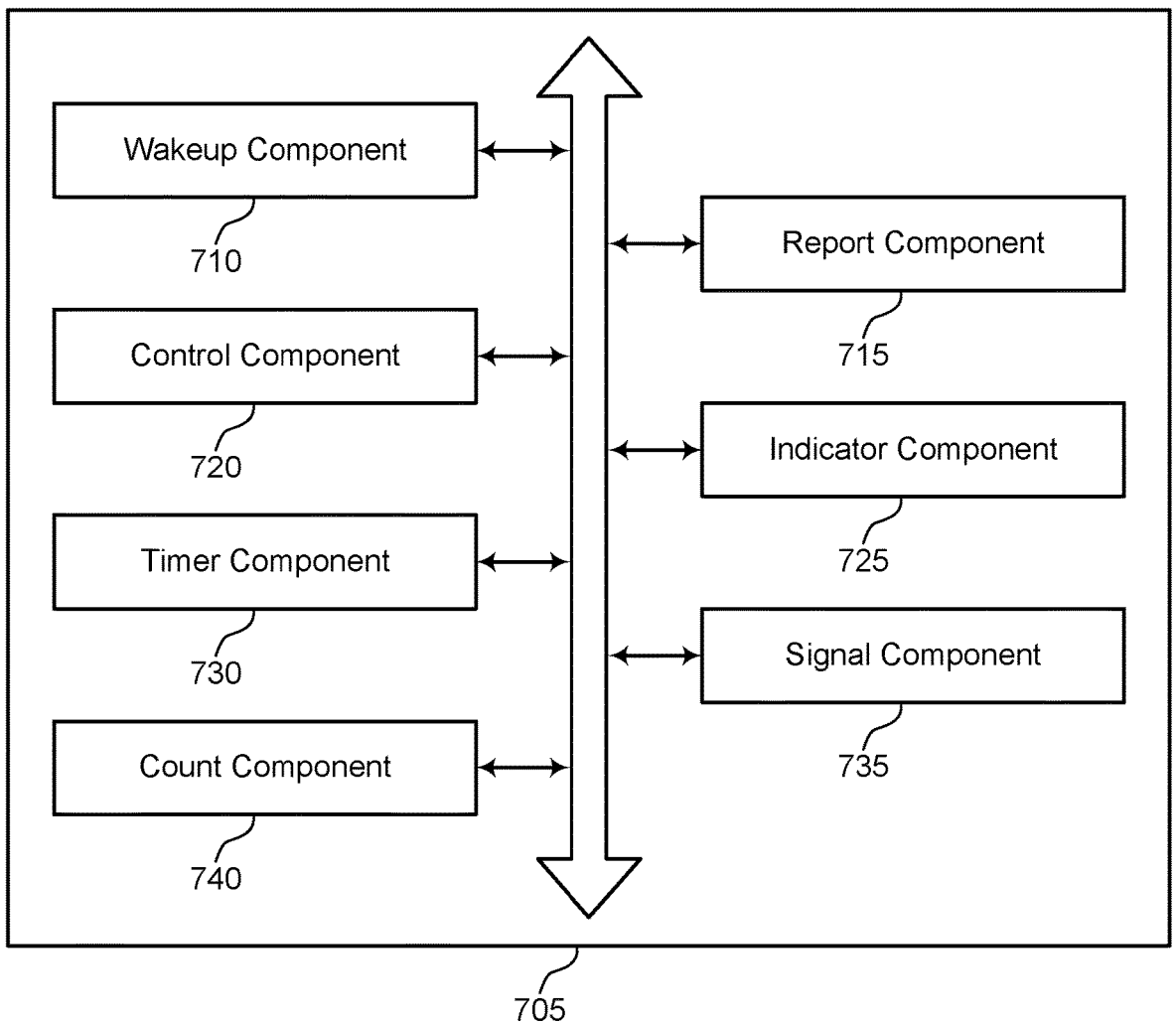
FIG. 7 shows a block diagram of a user equipment (UE) communications manager that supports CSI reporting over DRX operations in accordance with aspects of the present disclosure.

FIG. 7 shows a block diagram of a UE communications manager 705 that supports CSI reporting over DRX operations in accordance with aspects of the present disclosure. The UE communications manager 705 may be an example of aspects of a UE communications manager 515, a UE communications manager 615, or a UE communications manager 810 described herein. The UE communications manager 705 may include a wakeup component 710, a report component 715, a control component 720, an indicator component 725, a timer component 730, a signal component 735, and a count component 740. Each of these components may communicate, directly or indirectly, with one another (for example, via one or more buses).

The wakeup component 710 may monitor a wakeup signal monitoring occasion in an inactive duration of a DRX cycle. In some examples, the wakeup component 710 may determine an absence of a wakeup signal for the UE in the wakeup signal monitoring occasion based on monitoring the wakeup signal monitoring occasion. In some examples, the wakeup component 710 may monitor, in a second active duration of the DRX cycle, a downlink control channel for control information for the UE based on determining whether to monitor the downlink control channel for the control information for the UE. In some examples, receiving the control information is based on the monitoring of the downlink control channel. In some examples, the wakeup component 710 may refrain from monitoring, in the second active duration of the DRX cycle, the downlink control channel for the control information for the UE based on the determining. In some examples, the wakeup component 710 may determine an absence of a wakeup signal for the UE in the wakeup signal monitoring occasion based on monitoring the wakeup signal monitoring occasion. In some examples, transmitting the CSI report is based on the absence of the wakeup signal. In some examples, the downlink control channel includes a physical downlink control channel.

The report component 715 may transmit, in a first active duration of the DRX cycle, a CSI report on one or more resources based on the absence of the wakeup signal in the wakeup signal monitoring occasion. In some examples, the report component 715 may determine whether to monitor, in the second active duration of the DRX cycle, a downlink control channel for the control information for the UE based on the CSI report. In some examples, receiving the control information is based on the determining. In some examples, report component 715 may receive a message including a CSI reporting configuration. In some examples, transmitting the CSI report on the one or more resources includes autonomously transmitting the CSI report on the one or more resources based on the CSI reporting configuration. In some examples, report component 715 may autonomously transmit the CSI report includes transmitting the CSI report on the one or more resources independent of receiving a wakeup signal in the wakeup signal monitoring occasion in the inactive duration of the DRX cycle.

In some examples, the CSI reporting configuration includes an RRC configuration. In some examples, the one or more resources include one or more persistent scheduled resources. In some examples, the one or more resources include one or more semi-persistent scheduled resources. In some examples, one or more of the first active duration or the second active duration of the DRX cycle are contiguous. In some examples, one or more of the first active duration or the second active duration of the DRX cycle are noncontiguous. In some examples, the first active duration and the second active duration occur in a same active duration of the DRX cycle.

The control component 720 may receive, in the second active duration of the DRX cycle, the control information for the UE based on the CSI report. The indicator component 725 may transmit an indication that the UE requests reporting of the CSI report in the first active duration of the DRX cycle based on the absence of the wakeup signal in the wakeup signal monitoring occasion. In some examples, indicator component 725 may receive a message including a configuration indicating one or more resources of an uplink channel for transmitting the indication that the UE requests reporting of the CSI report. In some examples, transmitting the indication that the UE requests reporting of the CSI report includes transmitting the indication that the UE requests reporting of the CSI report on the one or more resources of the uplink channel. In some examples, the configuration includes an RRC configuration. In some examples, the uplink channel includes a physical uplink control channel. In some examples, the one or more resources of the uplink channel for the indication that the UE requests reporting of the CSI report correspond to one or more scheduling request resources.

The timer component 730 may initiate a CSI reporting timer based on transmitting the indication that the UE requests reporting of the CSI report. In some examples, transmitting the CSI report on the one or more resources is based on an expiration of the CSI reporting timer. In some examples, the timer component 730 may receive a timer configuration corresponding to the CSI reporting timer. In some examples, initiating the CSI reporting timer is based on the timer configuration. In some examples, the timer component 730 may initiate a downlink channel timer based on transmitting the CSI report on the one or more resources. In some examples, the timer component 730 may receive a timer configuration corresponding to the downlink channel timer. In some examples, initiating the downlink channel timer is based on the timer configuration.

The signal component 735 may measure one or more CSI reference signals in the first active duration of the DRX cycle. In some examples, signal component 735 may determine CSI based on the measuring. In some examples, transmitting the CSI report includes transmitting the CSI in the CSI report based on the CSI satisfying a threshold. In some examples, the CSI includes a channel quality indicator. In some examples, the CSI include a layer one reference signal received power.

The count component 740 may receive a message including a configuration associated with a CSI report count. In some examples, the configuration includes an RRC configuration. In some examples, the count component 740 may determine the CSI report count based on the RRC configuration. In some examples, transmitting the CSI report on the one or more resources is based on the CSI report count. In some examples, the count component 740 may refrain from transmitting, in a third active duration of the DRX cycle, a subsequent CSI report based on the CSI report count satisfying a threshold.

Figure 8:
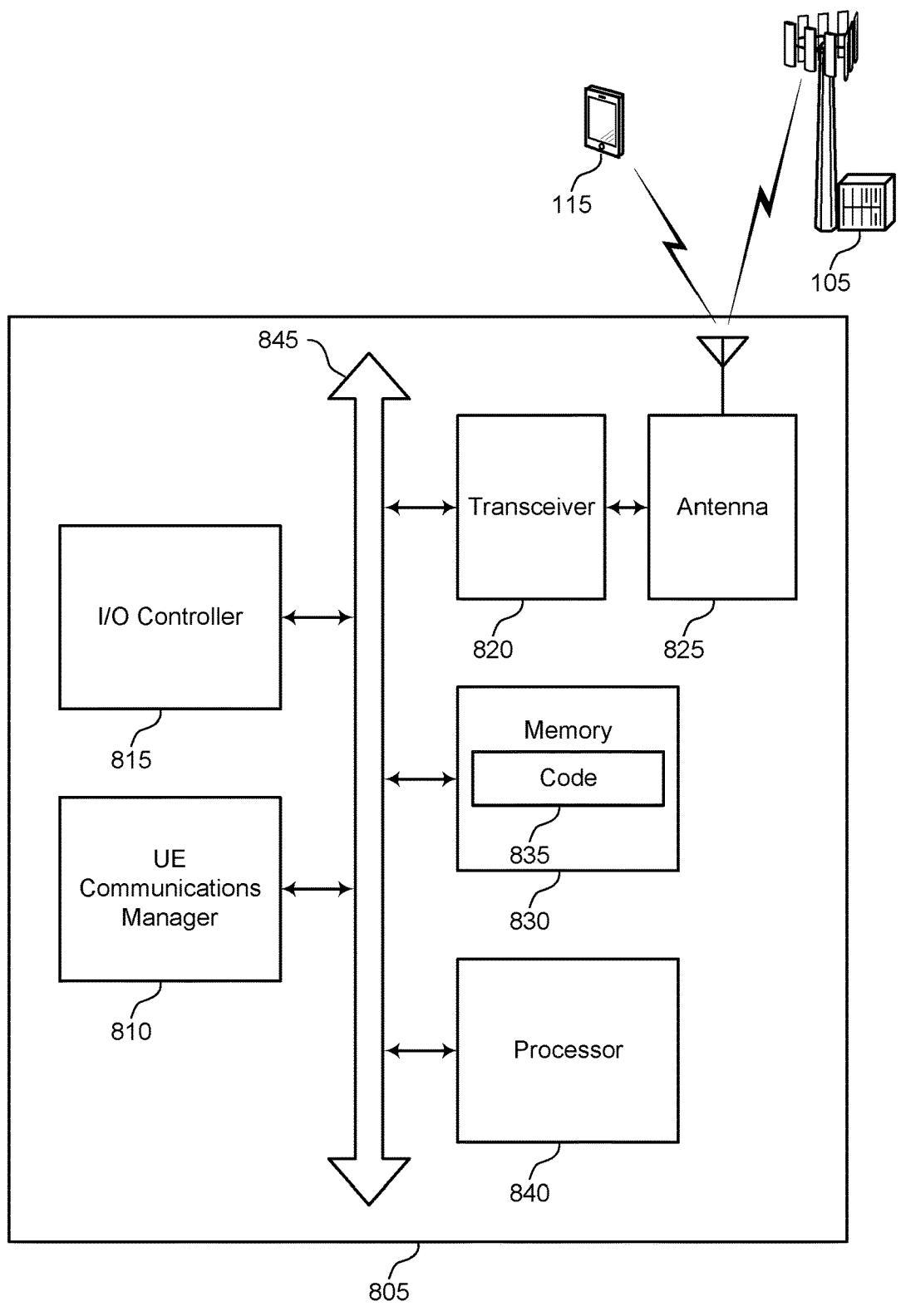
FIG. 8 shows a diagram of a system that supports CSI reporting over DRX operations in accordance with aspects of the present disclosure.

FIG. 8 shows a diagram of a system 800 that supports CSI reporting over DRX operations in accordance with aspects of the present disclosure. The system 800 may include a device 805, which may be an example of or include the components of device 505, device 605, or a UE 115. The device 805 may include components for bi-directional voice and data communications including components for transmitting and receiving communications, including a UE communications manager 810, an input/output (I/O) controller 815, a transceiver 820, an antenna 825, memory 830, and a processor 840. These components may be in electronic communication via one or more buses (for example, bus 845).

The UE communications manager 810 may monitor a wakeup signal monitoring occasion in an inactive duration of a DRX cycle, transmit, in a first active duration of the DRX cycle, a CSI report on one or more resources based on monitoring the wakeup signal monitoring occasion, and receive, in a second active duration of the DRX cycle, control information for the UE based on the CSI report.

The I/O controller 815 may manage input and output signals for the device 805. The I/O controller 815 may also manage peripherals not integrated into the device 805. In some examples, the I/O controller 815 may represent a physical connection or port to an external peripheral. In some examples, the I/O controller 815 may utilize an operating system such as iOS®, ANDROID®, MS-DOS®, MS-WINDOWS®, OS/2®, UNIX®, LINUX®, or another known operating system. In other examples, the I/O controller 815 may represent or interact with a modem, a keyboard, a mouse, a touchscreen, or a similar device. In some examples, the I/O controller 815 may be implemented as part of a processor. In some examples, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some examples, the device 805 may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some examples, the memory 830 may contain, among other things, a basic I/O system (BIOS) which may control basic hardware or software operation such as the interaction with peripheral components or devices.

The processor 840 may include an intelligent hardware device, (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some examples, the processor 840 may be configured to operate a memory array using a memory controller. In other examples, a memory controller may be integrated into the processor 840. The processor 840 may be configured to execute computer-readable instructions stored in a memory (for example, the memory 830) to cause the device 805 to perform various functions (for example, functions or tasks supporting CSI reporting over DRX operations).

The code 835 may include instructions to implement aspects of the present disclosure, including instructions to support wireless communications. The code 835 may be stored in a non-transitory computer-readable medium such as system memory or other type of memory. In some examples, the code 835 may not be directly executable by the processor 840 but may cause a computer (for example, when compiled and executed) to perform functions described herein.

Figure 9:
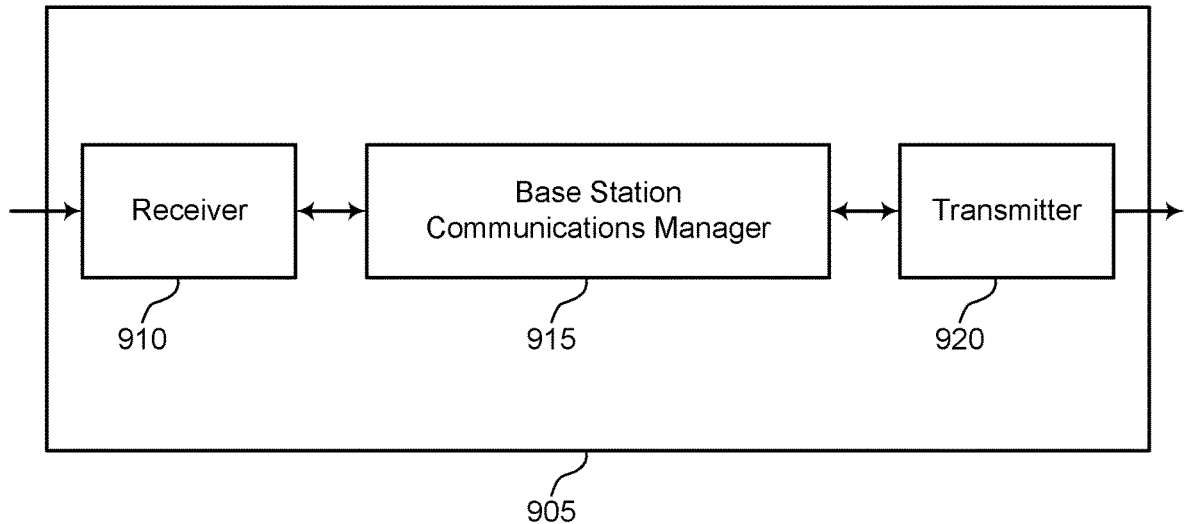
FIGS. 9 and 10 show block diagrams of devices that support CSI reporting over DRX operations in accordance with aspects of the present disclosure.

FIG. 9 shows a block diagram of a device 905 that supports CSI reporting over DRX operations in accordance with aspects of the present disclosure. The device 905 may be an example of aspects of a base station 105 as described herein. The device 905 may include a receiver 910, a base station communications manager 915, and a transmitter 920. The base station communications manager 915 can be implemented, at least in part, by one or both of a modem and a processor. Each of these components may be in communication with one another (for example, via one or more buses).

The receiver 910 may receive information such as packets, user data, or control information associated with various information channels (for example, control channels, data channels, and information related to CSI reporting over DRX operations). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may receive, in a first active duration of a DRX cycle, a CSI report on one or more resources and transmit, in a second active duration of the DRX cycle, control information on a downlink control channel for a UE based on the CSI report. The base station communications manager 915 may be an example of aspects of the base station communications manager 1210 described herein.

The transmitter 920 may transmit signals generated by other components of the device 905. In some examples, the transmitter 920 may be collocated with a receiver 910 in a transceiver component. For example, the transmitter 920 may be an example of aspects of the transceiver 1220 described with reference to FIG. 12. The transmitter 920 may utilize a single antenna or a set of antennas.

Figure 10:
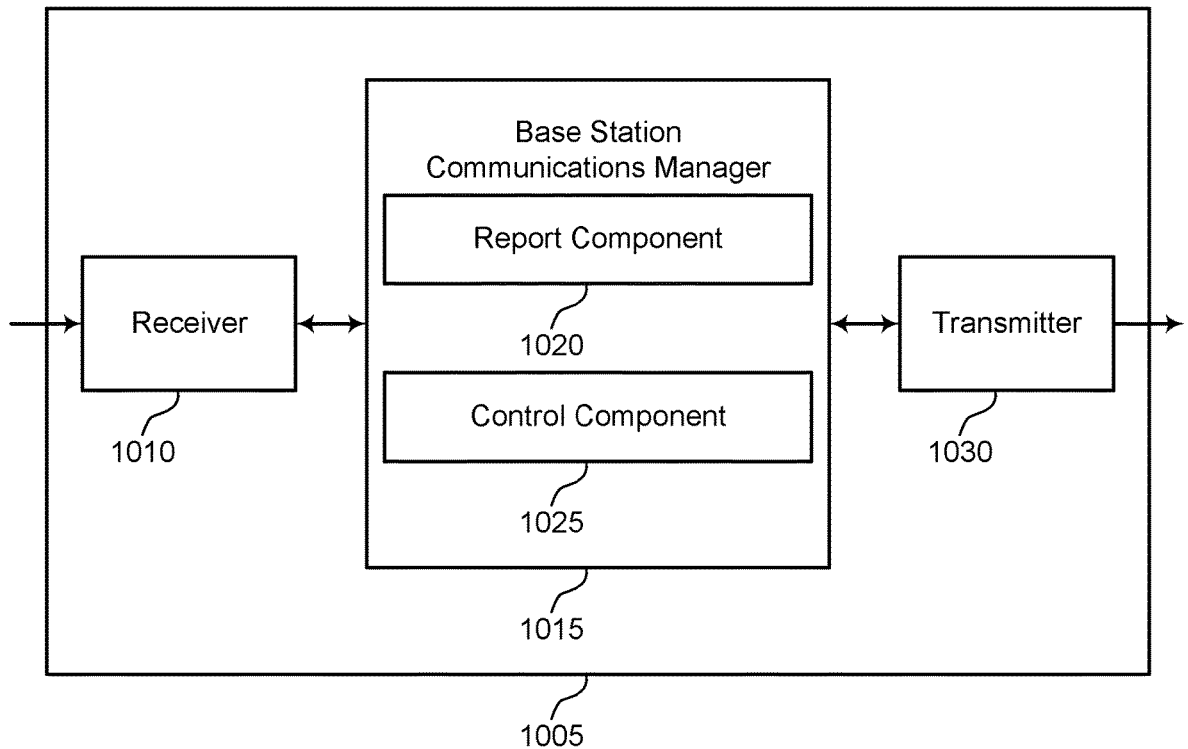

FIG. 10 shows a block diagram of a device 1005 that supports CSI reporting over DRX operations in accordance with aspects of the present disclosure. The device 1005 may be an example of aspects of a device 905, or a base station 105 as described herein. The device 1005 may include a receiver 1010, a base station communications manager 1015, and a transmitter 1030. The base station communications manager 1015 can be implemented, at least in part, by one or both of a modem and a processor. Each of these components may be in communication with one another (for example, via one or more buses).

The receiver 1010 may receive information such as packets, user data, or control information associated with various information channels (for example, control channels, data channels, and information related to CSI reporting over DRX operations). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a report component 1020 and a control component 1025. The base station communications manager 1015 may be an example of aspects of the base station communications manager 1210 described herein. The report component 1020 may receive, in a first active duration of a DRX cycle, a CSI report on one or more resources. The control component 1025 may transmit, in a second active duration of the DRX cycle, control information on a downlink control channel for a UE based on the CSI report.

The transmitter 1030 may transmit signals generated by other components of the device 1005. In some examples, the transmitter 1030 may be collocated with a receiver 1010 in a transceiver component. For example, the transmitter 1030 may be an example of aspects of the transceiver 1220 described with reference to FIG. 12. The transmitter 1030 may utilize a single antenna or a set of antennas.

Figure 11:
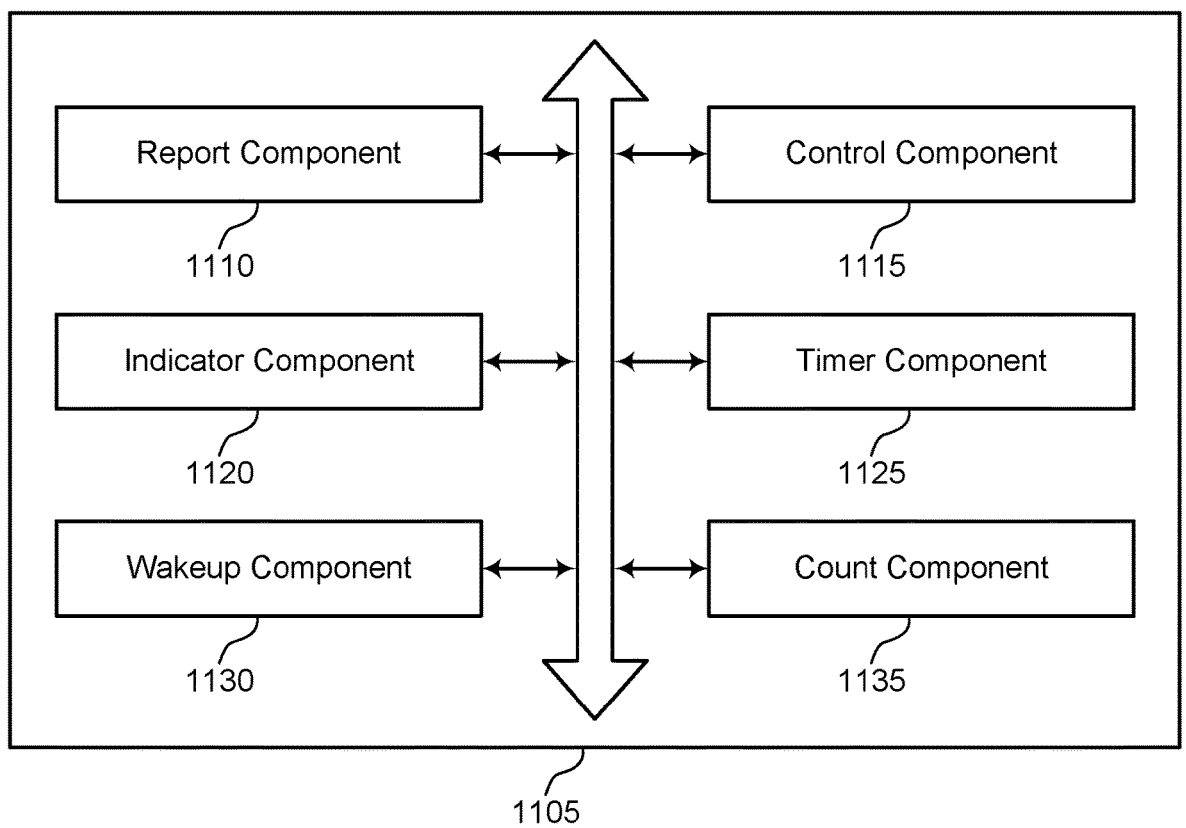
FIG. 11 shows a block diagram of a base station communications manager that supports CSI reporting over DRX operations in accordance with aspects of the present disclosure.

FIG. 11 shows a block diagram of a base station communications manager 1105 that supports CSI reporting over DRX operations in accordance with aspects of the present disclosure. The base station communications manager 1105 may be an example of aspects of a base station communications manager 915, a base station communications manager 1015, or a base station communications manager 1210 described herein. The base station communications manager 1105 may include a report component 1110, a control component 1115, an indicator component 1120, a timer component 1125, a wakeup component 1130, and a count component 1135. Each of these components may communicate, directly or indirectly, with one another (for example, via one or more buses).

The report component 1110 may receive, in a first active duration of a DRX cycle, a CSI report on one or more resources. In some examples, the report component 1110 may monitor the one or more resources and receive, in the first active duration of the DRX cycle, the CSI report on the one or more resources based on the monitoring. In some examples, the report component 1110 may transmit a message including a CSI reporting configuration. In some examples, receiving, in the first active duration of the DRX cycle, the CSI report on the one or more resources is based on the CSI reporting configuration.

In some examples, the CSI reporting configuration includes an RRC configuration. In some examples, the one or more resources include one or more persistent scheduled resources. In some examples, the one or more resources include one or more semi-persistent scheduled resources. In some examples, one or more of the first active duration or the second active duration of the DRX cycle are contiguous. In some examples, one or more of the first active duration or the second active duration of the DRX cycle are noncontiguous. In some examples, the first active duration and the second active duration occur in a same active duration of the DRX cycle.

The control component 1115 may transmit, in a second active duration of the DRX cycle, control information on a downlink control channel for a UE based on the CSI report. In some examples, the downlink control channel includes a physical downlink control channel. The indicator component 1120 may receive an indication that the UE requests reporting of the CSI report in the first active duration of the DRX cycle. In some examples, receiving, in the first active duration of the DRX cycle, the CSI report on the one or more resources is based on the indication. In some examples, indicator component 1120 may transmit a message including a configuration indicating one or more resources of an uplink channel for the indication that the UE requests reporting of the CSI report. In some examples, receiving the indication that the UE requests reporting of the CSI report includes receiving the indication that the UE requests reporting of the CSI report on the one or more resources of the uplink channel. In some examples, the configuration includes an RRC configuration.

The timer component 1125 may transmit a timer configuration corresponding to a CSI reporting timer. In some examples, the timer component 1125 may transmit a timer configuration corresponding to a downlink channel timer. The wakeup component 1130 may transmit, in a wakeup signal monitoring occasion of a subsequent DRX cycle, a wakeup signal that indicates a third active duration of the subsequent DRX cycle for the UE. In some examples, the wakeup component 1130 may transmit, in the third active duration of the subsequent DRX cycle, the downlink control channel for the control information for the UE based on the wakeup signal. The count component 1135 may transmit a message including a configuration associated with a CSI report count. In some examples, the configuration includes an RRC configuration, and receiving, in the first active duration of the DRX cycle, the CSI report on the one or more resources is based on the CSI report count.

Figure 12:
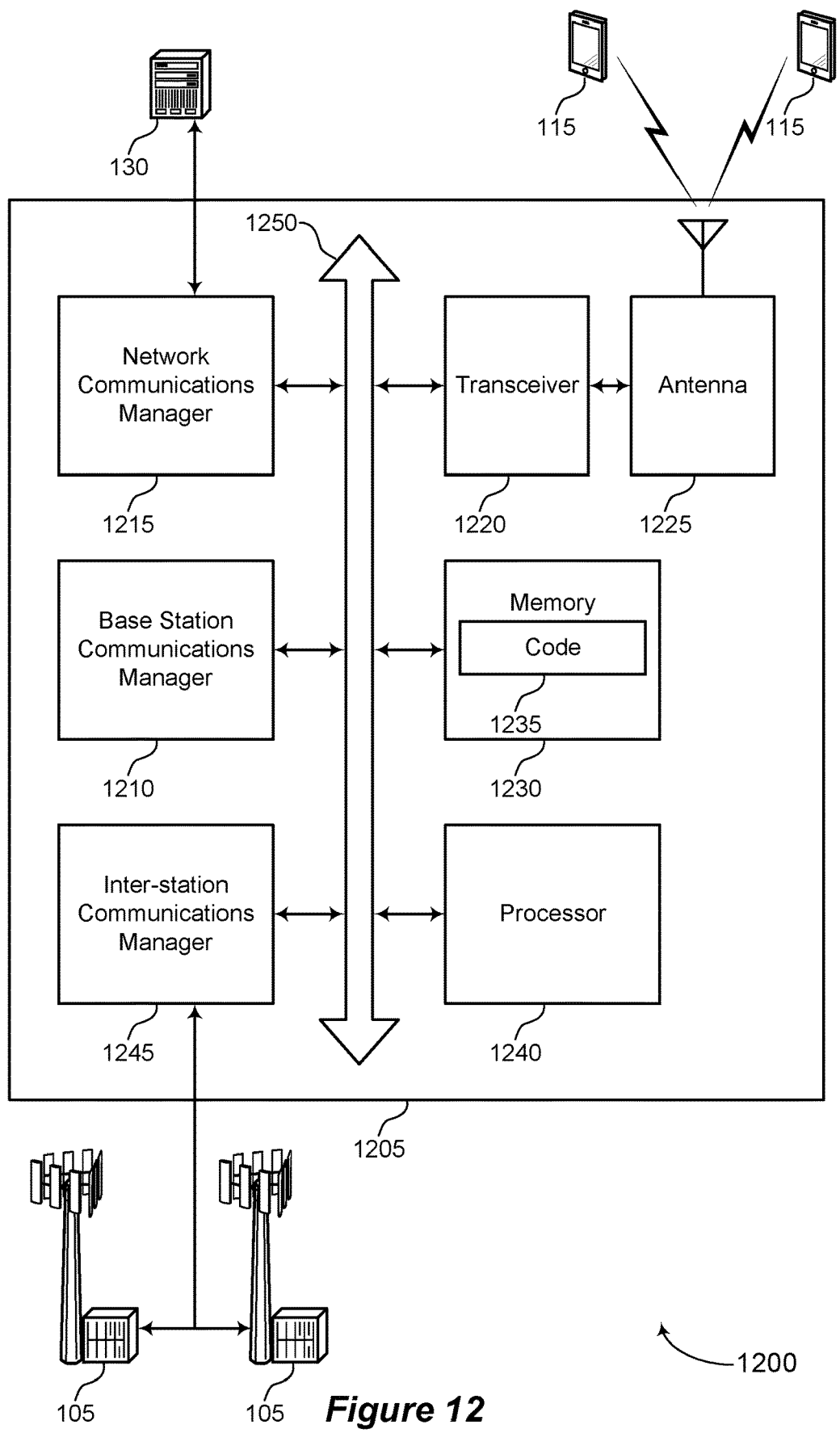
FIG. 12 shows a diagram of a system that supports CSI reporting over DRX operations in accordance with aspects of the present disclosure.

FIG. 12 shows a diagram of a system 1200 that supports CSI reporting over DRX operations in accordance with aspects of the present disclosure. The system 1200 may include a device 1205, which may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (for example, bus 1250).

The base station communications manager 1210 may receive, in a first active duration of a DRX cycle, a CSI report on one or more resources and transmit, in a second active duration of the DRX cycle, control information on a downlink control channel for a UE based on the CSI report. The network communications manager 1215 may manage communications with the core network (for example, via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some examples, the device 1205 may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (for example, the processor 1240) cause the device to perform various functions described herein. In some examples, the memory 1230 may contain, among other things, a BIOS which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some examples, the code 1235 may not be directly executable by the processor 1240 but may cause a computer (for example, when compiled and executed) to perform functions described herein.

The processor 1240 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1240 may be configured to operate a memory array using a memory controller. In some examples, a memory controller may be integrated into processor 1240. The processor 1240 may be configured to execute computer-readable instructions stored in a memory (for example, the memory 1230) to cause the device 1205 to perform various functions (for example, functions or tasks supporting CSI reporting over DRX operations).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

Figure 13:
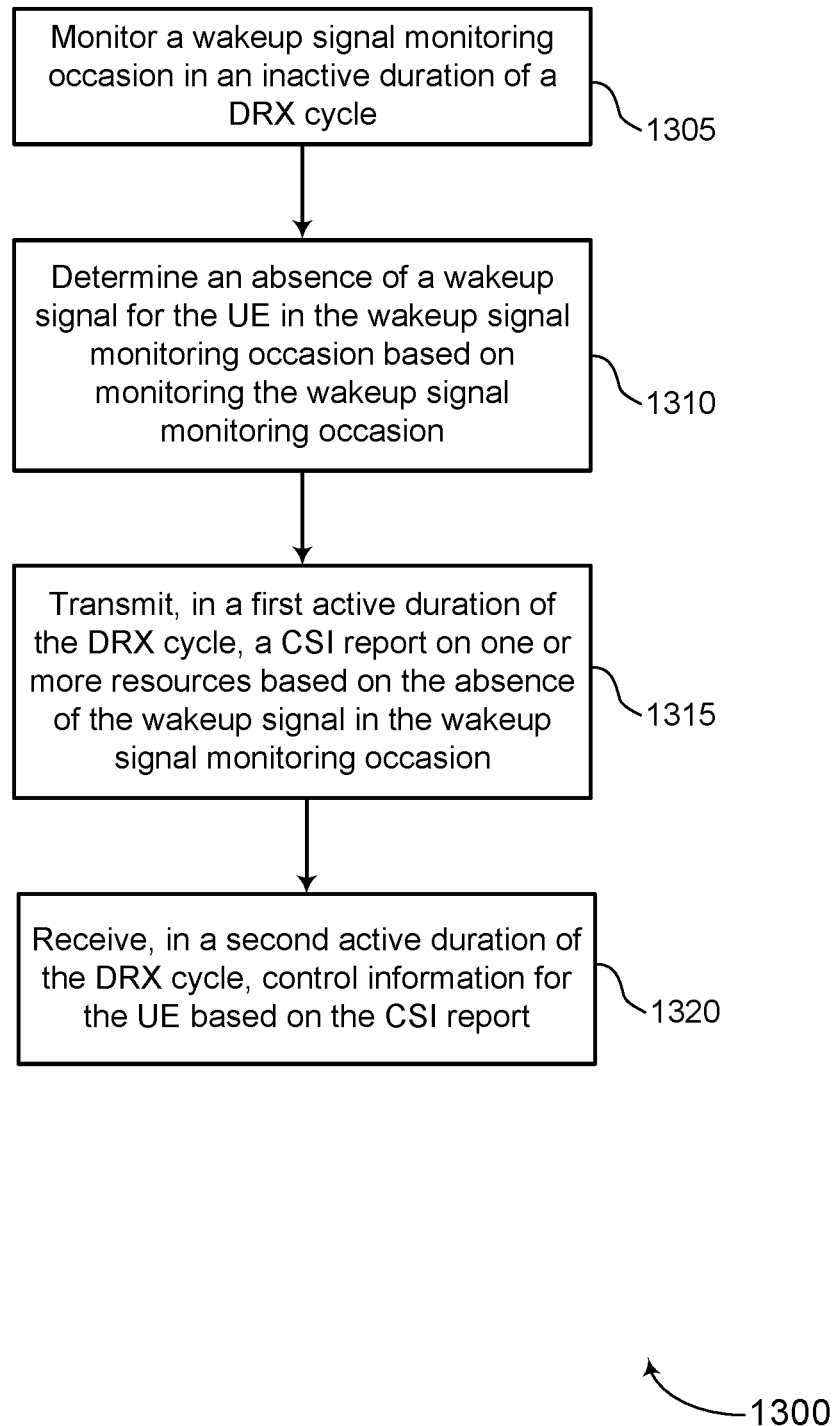
FIGS. 13-17 show flowcharts illustrating processes that support CSI reporting over DRX operations in accordance with aspects of the present disclosure.

FIG. 13 shows a flowchart illustrating a process 1300 that supports CSI reporting over DRX operations in accordance with aspects of the present disclosure. The operations of process 1300 may be implemented by a UE 115 or its components as described herein. For example, the operations of process 1300 may be performed by a UE communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1305, the UE may monitor a wakeup signal monitoring occasion in an inactive duration of a DRX cycle. The operations of 1305 may be performed according to the processes described herein. In some examples, aspects of the operations of 1305 may be performed by a wakeup component as described with reference to FIGS. 5-8.

At 1310, the UE may determine an absence of a wakeup signal for the UE in the wakeup signal monitoring occasion based on monitoring the wakeup signal monitoring occasion. The operations of 1310 may be performed according to the processes described herein. In some examples, aspects of the operations of 1310 may be performed by a wakeup component as described with reference to FIGS. 5-8.

At 1315, the UE may transmit, in a first active duration of the DRX cycle, a CSI report on one or more resources based on the absence of the wakeup signal in the wakeup signal monitoring occasion. The operations of 1315 may be performed according to the processes described herein. In some examples, aspects of the operations of 1315 may be performed by a report component as described with reference to FIGS. 5-8.

At 1320, the UE may receive, in a second active duration of the DRX cycle, control information for the UE based on the CSI report. The operations of 1320 may be performed according to the processes described herein. In some examples, aspects of the operations of 1320 may be performed by a control component as described with reference to FIGS. 5-8.

Figure 14:
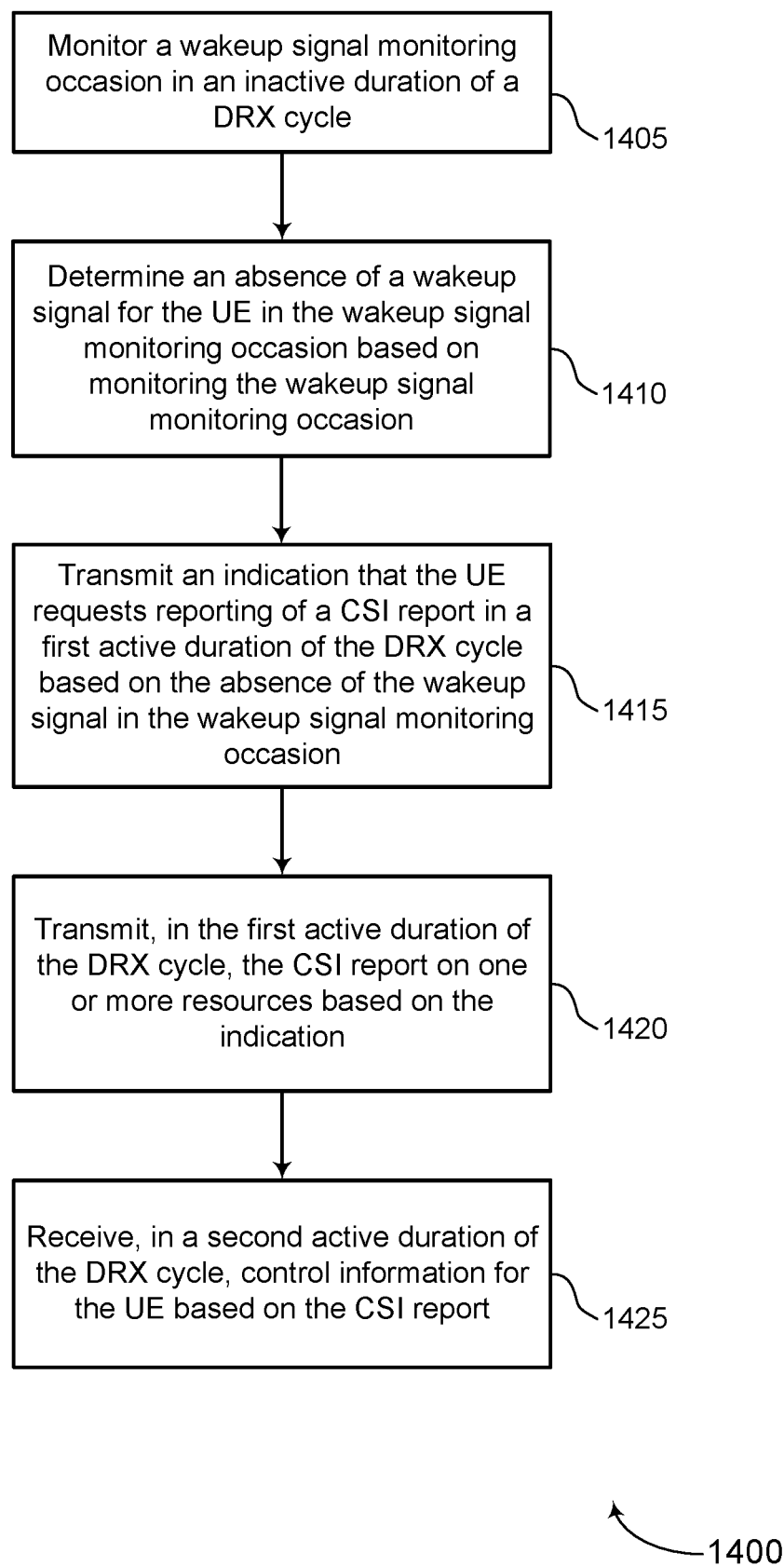

FIG. 14 shows a flowchart illustrating a process 1400 that supports CSI reporting over DRX operations in accordance with aspects of the present disclosure. The operations of process 1400 may be implemented by a UE 115 or its components as described herein. For example, the operations of process 1400 may be performed by a UE communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1405, the UE may monitor a wakeup signal monitoring occasion in an inactive duration of a DRX cycle. The operations of 1405 may be performed according to the processes described herein. In some examples, aspects of the operations of 1405 may be performed by a wakeup component as described with reference to FIGS. 5-8.

At 1410, the UE may determine an absence of a wakeup signal for the UE in the wakeup signal monitoring occasion based on monitoring the wakeup signal monitoring occasion. The operations of 1410 may be performed according to the processes described herein. In some examples, aspects of the operations of 1410 may be performed by a wakeup component as described with reference to FIGS. 5-8.

At 1415, the UE may transmit an indication that the UE requests reporting of a CSI report in a first active duration of the DRX cycle based on the absence of the wakeup signal in the wakeup signal monitoring occasion. The operations of 1415 may be performed according to the processes described herein. In some examples, aspects of the operations of 1415 may be performed by an indicator component as described with reference to FIGS. 5-8.

At 1420, the UE may transmit, in the first active duration of the DRX cycle, the CSI report on one or more resources based on the indication. The operations of 1420 may be performed according to the processes described herein. In some examples, aspects of the operations of 1420 may be performed by a report component as described with reference to FIGS. 5-8.

At 1425, the UE may receive, in a second active duration of the DRX cycle, control information for the UE based on the CSI report. The operations of 1425 may be performed according to the processes described herein. In some examples, aspects of the operations of 1425 may be performed by a control component as described with reference to FIGS. 5-8.

Figure 15:
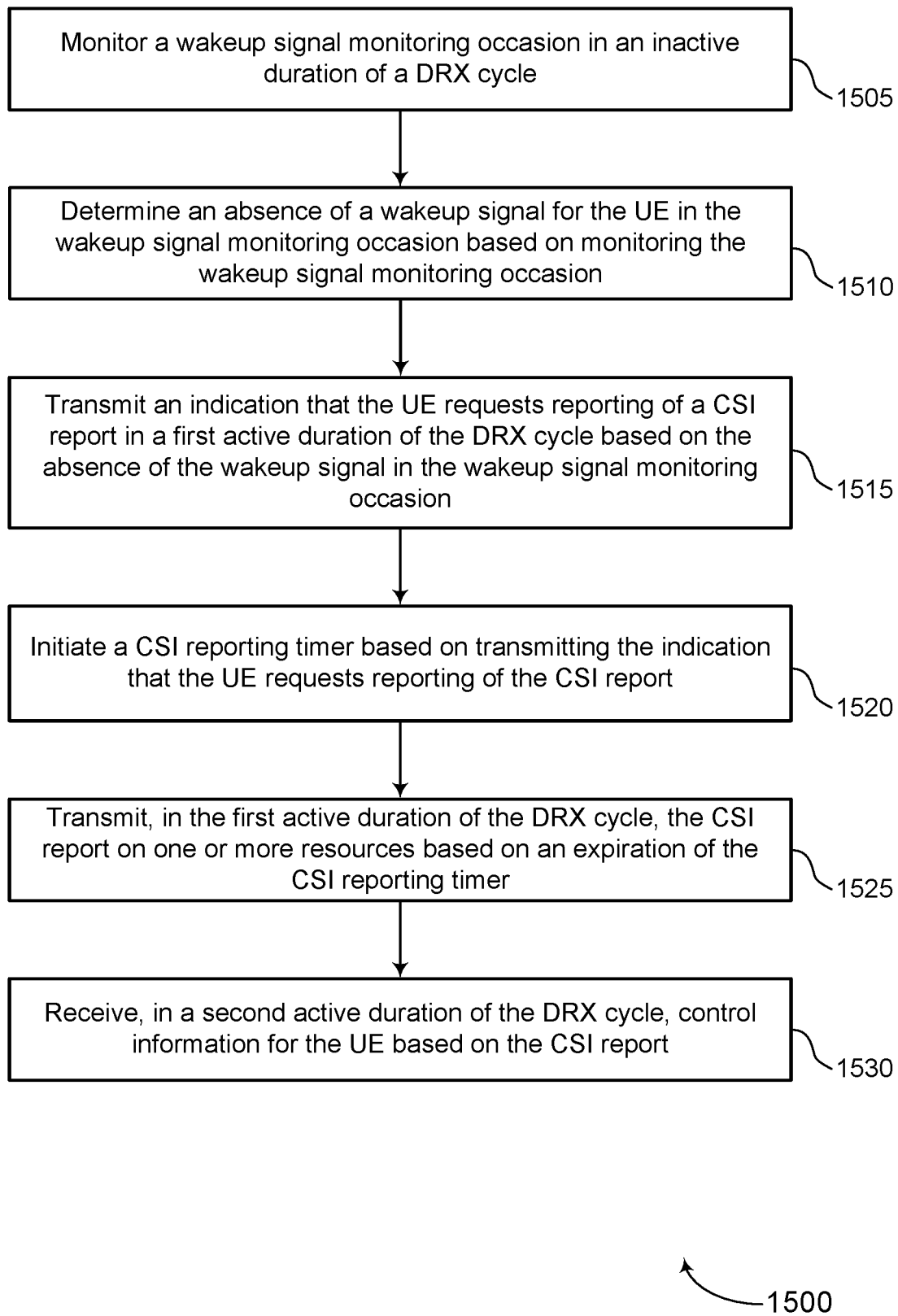

FIG. 15 shows a flowchart illustrating a process 1500 that supports CSI reporting over DRX operations in accordance with aspects of the present disclosure. The operations of process 1500 may be implemented by a UE 115 or its components as described herein. For example, the operations of process 1500 may be performed by a UE communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1505, the UE may monitor a wakeup signal monitoring occasion in an inactive duration of a DRX cycle. The operations of 1505 may be performed according to the processes described herein. In some examples, aspects of the operations of 1505 may be performed by a wakeup component as described with reference to FIGS. 5-8.

At 1510, the UE may determine an absence of a wakeup signal for the UE in the wakeup signal monitoring occasion based on monitoring the wakeup signal monitoring occasion. The operations of 1510 may be performed according to the processes described herein. In some examples, aspects of the operations of 1510 may be performed by a wakeup component as described with reference to FIGS. 5-8.

At 1515, the UE may transmit an indication that the UE requests reporting of a CSI report in the first active duration of the DRX cycle based on the absence of the wakeup signal in the wakeup signal monitoring occasion. The operations of 1515 may be performed according to the processes described herein. In some examples, aspects of the operations of 1515 may be performed by an indicator component as described with reference to FIGS. 5-8.

At 1520, the UE may initiate a CSI reporting timer based on transmitting the indication that the UE requests reporting of the CSI report. The operations of 1520 may be performed according to the processes described herein. In some examples, aspects of the operations of 1520 may be performed by a timer component as described with reference to FIGS. 5-8.

At 1525, the UE may transmit, in the first active duration of the DRX cycle, the CSI report on one or more resources based on an expiration of the CSI reporting timer. The operations of 1525 may be performed according to the processes described herein. In some examples, aspects of the operations of 1525 may be performed by a report component as described with reference to FIGS. 5-8.

At 1530, the UE may receive, in a second active duration of the DRX cycle, control information for the UE based on the CSI report. The operations of 1530 may be performed according to the processes described herein. In some examples, aspects of the operations of 1530 may be performed by a control component as described with reference to FIGS. 5-8.

Figure 16:
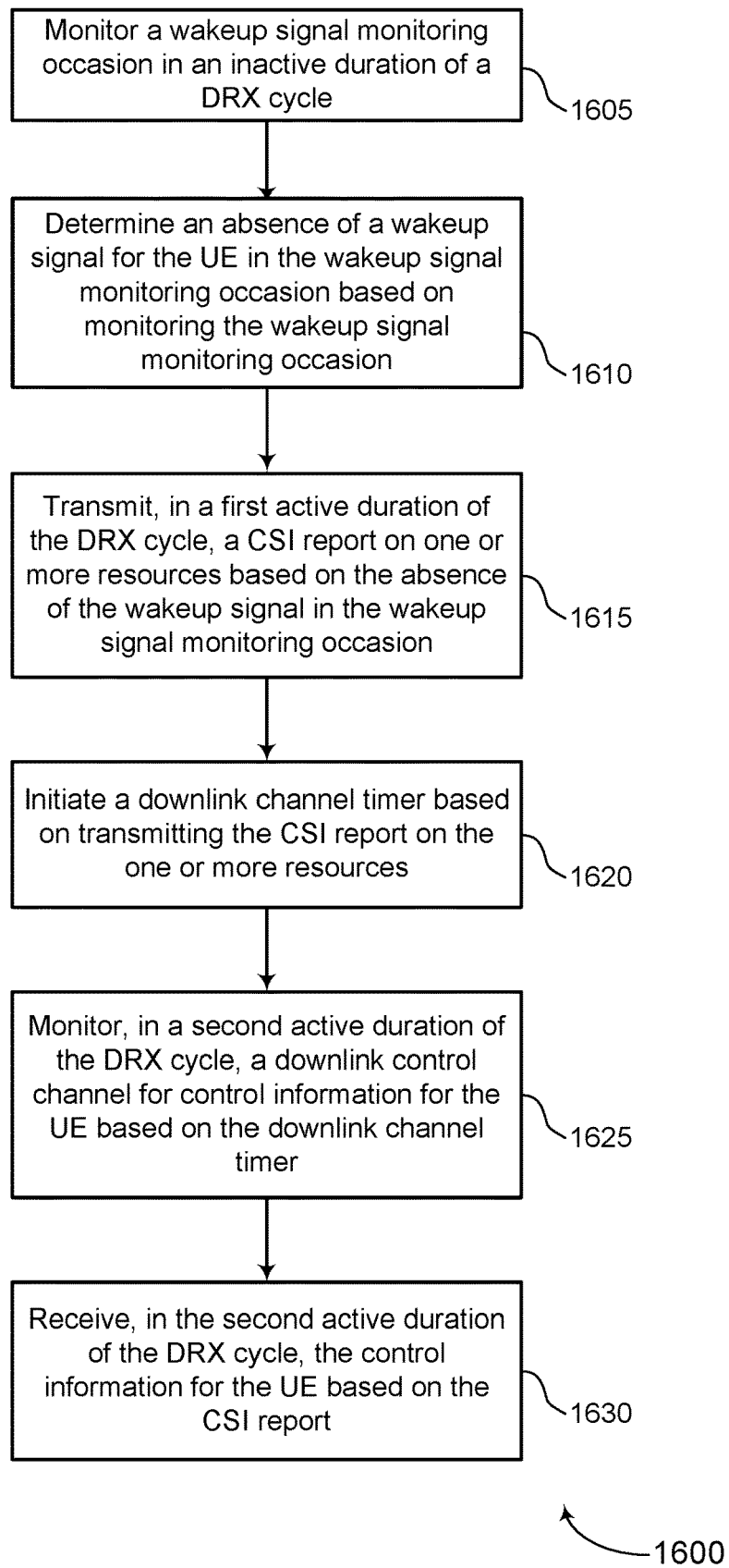

FIG. 16 shows a flowchart illustrating a process 1600 that supports CSI reporting over DRX operations in accordance with aspects of the present disclosure. The operations of process 1600 may be implemented by a UE 115 or its components as described herein. For example, the operations of process 1600 may be performed by a UE communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1605, the UE may monitor a wakeup signal monitoring occasion in an inactive duration of a DRX cycle. The operations of 1605 may be performed according to the processes described herein. In some examples, aspects of the operations of 1605 may be performed by a wakeup component as described with reference to FIGS. 5-8.

At 1610, the UE may determine an absence of a wakeup signal for the UE in the wakeup signal monitoring occasion based on monitoring the wakeup signal monitoring occasion. The operations of 1610 may be performed according to the processes described herein. In some examples, aspects of the operations of 1610 may be performed by a wakeup component as described with reference to FIGS. 5-8.

At 1615, the UE may transmit, in a first active duration of the DRX cycle, a CSI report on one or more resources based on the absence of the wakeup signal in the wakeup signal monitoring occasion. The operations of 1615 may be performed according to the processes described herein. In some examples, aspects of the operations of 1615 may be performed by a report component as described with reference to FIGS. 5-8.

At 1620, the UE may initiate a downlink channel timer based on transmitting the CSI report on the one or more resources. The operations of 1620 may be performed according to the processes described herein. In some examples, aspects of the operations of 1620 may be performed by a timer component as described with reference to FIGS. 5-8.

At 1625, the UE may monitor, in a second active duration of the DRX cycle, a downlink control channel for the control information for the UE based on the downlink channel timer. The operations of 1625 may be performed according to the processes described herein. In some examples, aspects of the operations of 1625 may be performed by a wakeup component as described with reference to FIGS. 5-8.

At 1630, the UE may receive, in the second active duration of the DRX cycle, the control information for the UE based on the CSI report. The operations of 1630 may be performed according to the processes described herein. In some examples, aspects of the operations of 1630 may be performed by a control component as described with reference to FIGS. 5-8.

Figure 17:
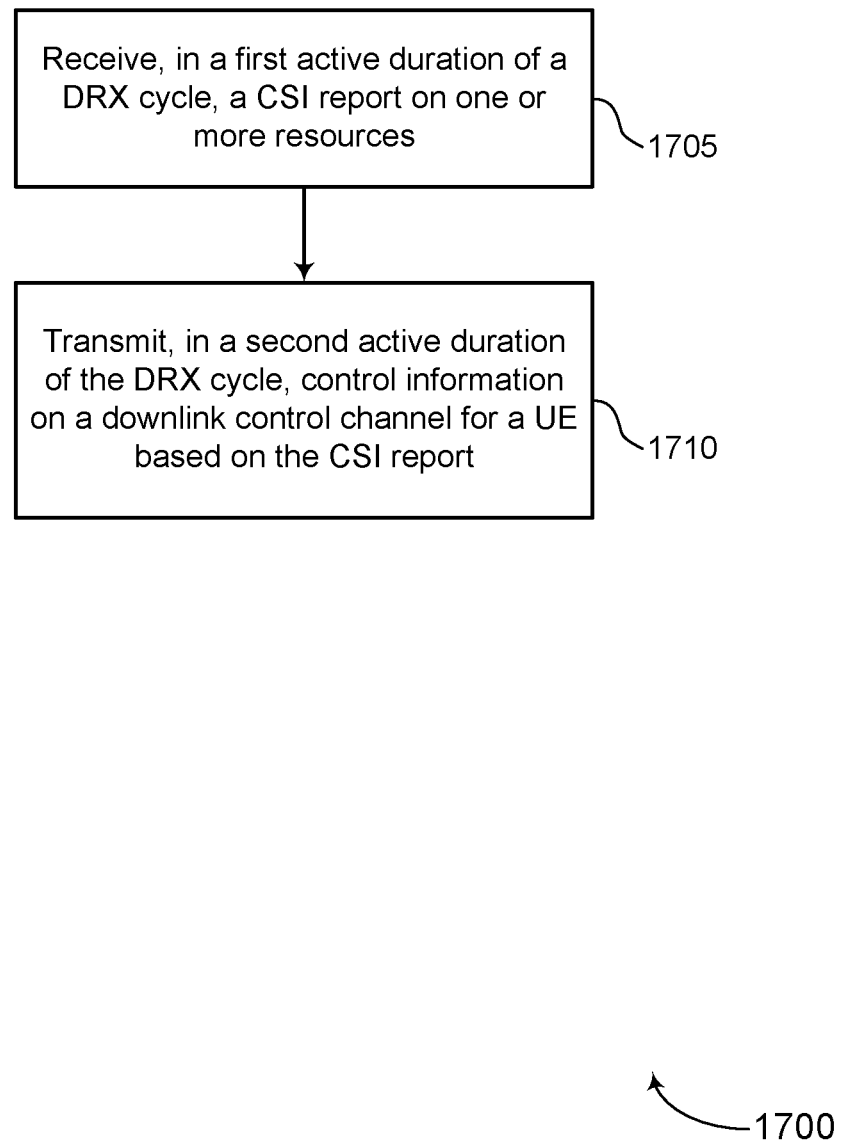

FIG. 17 shows a flowchart illustrating a process 1700 that supports CSI reporting over DRX operations in accordance with aspects of the present disclosure. The operations of process 1700 may be implemented by a base station 105 or its components as described herein. For example, the operations of process 1700 may be performed by a base station communications manager as described with reference to FIGS. 9-12. In some examples, a base station may execute a set of instructions to control the functional elements of the base station to perform the functions described below.

Additionally or alternatively, a base station may perform aspects of the functions described below using special-purpose hardware.

At 1705, the base station may receive, in a first active duration of a DRX cycle, a CSI report on one or more resources. The operations of 1705 may be performed according to the processes described herein. In some examples, aspects of the operations of 1705 may be performed by a report component as described with reference to FIGS. 9-12.

At 1710, the base station may transmit, in a second active duration of the DRX cycle, control information on a downlink control channel for a UE based on the CSI report. The operations of 1710 may be performed according to the processes described herein. In some examples, aspects of the operations of 1710 may be performed by a control component as described with reference to FIGS. 9-12.

The processes described herein describe possible implementations, and that the operations and the steps may be rearranged or otherwise modified and that other implementations are possible. Further, aspects from two or more of the processes may be combined.

SUMMARY OF ASPECTS

The following provides an overview of aspects of the present disclosure:

Aspect 1: A method for wireless communications at a UE, comprising: monitoring a wakeup signal monitoring occasion in an inactive duration of a discontinuous reception cycle; determining an absence of a wakeup signal for the UE in the wakeup signal monitoring occasion based at least in part on monitoring the wakeup signal monitoring occasion; transmitting, in a first active duration of the discontinuous reception cycle, a channel state information report on one or more resources based at least in part on the absence of the wakeup signal in the wakeup signal monitoring occasion; and receiving, in a second active duration of the discontinuous reception cycle, control information for the UE based at least in part on the channel state information report.

Aspect 2: The method of aspect 1, further comprising transmitting an indication that the UE requests reporting of the channel state information report in the first active duration of the discontinuous reception cycle based at least in part on the absence of the wakeup signal monitoring occasion.

Aspect 3: The method of aspect 2, further comprising initiating a channel state information reporting timer based at least in part on transmitting the indication that the UE requests reporting of the channel state information report, wherein transmitting the channel state information report on the one or more resources is based at least in part on an expiration of the channel state information reporting timer.

Aspect 4: The method of aspect 3, further comprising receiving a timer configuration corresponding to the channel state information reporting timer, wherein initiating the channel state information reporting timer is based at least in part on the timer configuration.

Aspect 5: The method of any of aspects 2 through 4, further comprising receiving a message comprising a configuration indicating one or more resources of an uplink channel for transmitting the indication that the UE requests reporting of the channel state information report, wherein transmitting the indication that the UE requests reporting of the channel state information report comprises transmitting the indication that the UE requests reporting of the channel state information report on the one or more resources of the uplink channel.

Aspect 6: The method of aspect 5, wherein the configuration comprises a radio resource control configuration.

Aspect 7: The method of any of aspects 5 through 6, wherein the uplink channel comprises a physical uplink control channel.

Aspect 8: The method of any of aspects 5 through 7, wherein the one or more resources of the uplink channel for the indication that the UE requests reporting of the channel state information report corresponds to one or more scheduling request resources.

Aspect 9: The method of any of aspects 1 through 8, further comprising receiving a message comprising a channel state information reporting configuration, wherein transmitting the channel state information report on the one or more resources comprises autonomously transmitting the channel state information report on the one or more resources based at least in part on the channel state information reporting configuration.

Aspect 10: The method of aspect 9, wherein autonomously transmitting the channel state information report comprises transmitting the channel state information report on the one or more resources independent of receiving a wakeup signal in the wakeup signal monitoring occasion in the inactive duration of the discontinuous reception cycle.

Aspect 11: The method of any of aspects 9 through 10, wherein the channel state information reporting configuration comprises a radio resource control configuration.

Aspect 12: The method of any of aspects 1 through 11, further comprising determining an absence of a wakeup signal for the UE in the wakeup signal monitoring occasion based at least in part on monitoring the wakeup signal monitoring occasion, wherein transmitting the channel state information report is based at least in part on the absence of the wakeup signal.

Aspect 13: The method of any of aspects 1 through 12, further comprising determining whether to monitor, in the second active duration of the discontinuous reception cycle, a downlink control channel for the control information for the UE based at least in part on the channel state information report, wherein receiving the control information is based at least in part on the determining.

Aspect 14: The method of aspect 13, further comprising monitoring, in the second active duration of the discontinuous reception cycle, the downlink control channel for the control information for the UE based at least in part on determining whether to monitor the downlink control channel for the control information for the UE, wherein receiving the control information is based at least in part on the monitoring of the downlink control channel.

Aspect 15: The method of aspect 14, wherein the downlink control channel comprises a physical downlink control channel.

Aspect 16: The method of aspect 13, further comprising refraining from monitoring, in the second active duration of the discontinuous reception cycle, the downlink control channel for the control information for the UE based at least in part on the determining.

Aspect 17: The method of any of aspects 1 through 16, further comprising: initiating a downlink channel timer based at least in part on transmitting the channel state information report on the one or more resources; and monitoring, in the second active duration of the discontinuous reception cycle, a downlink control channel for the control information for the UE based at least in part on the downlink channel timer.

Aspect 18: The method of aspect 17, further comprising receiving a timer configuration corresponding to the downlink channel timer, wherein initiating the downlink channel timer is based at least in part on the timer configuration.

Aspect 19: The method of any of aspects 1 through 18, further comprising: measuring one or more channel state information reference signals in the first active duration of the discontinuous reception cycle; and determining channel state information based at least in part on the measuring, wherein transmitting the channel state information report comprises transmitting the channel state information in the channel state information report based at least in part on the channel state information satisfying a threshold.

Aspect 20: The method of aspect 19, wherein the channel state information comprises a channel quality indicator.

Aspect 21: The method of any of aspects 19 through 20, wherein the channel state information comprises a layer one reference signal received power.

Aspect 22: The method of any of aspects 1 through 21, wherein the one or more resources comprise one or more persistent scheduled resources.

Aspect 23: The method of any of aspects 1 through 22, wherein the one or more resources comprise one or more semi-persistent scheduled resources.

Aspect 24: The method of any of aspects 1 through 23, wherein one or more of the first active duration or the second active duration of the discontinuous reception cycle are contiguous.

Aspect 25: The method of any of aspects 1 through 24, wherein one or more of the first active duration or the second active duration of the discontinuous reception cycle are noncontiguous.

Aspect 26: The method of any of aspects 1 through 25, wherein the first active duration and the second active duration occur in a same active duration of the discontinuous reception cycle.

Aspect 27: The method of any of aspects 1 through 26, further comprising: receiving a message comprising a configuration associated with a channel state information report count, wherein the configuration comprises a radio resource control configuration; and determining the channel state information report count based at least in part on the radio resource control configuration, wherein transmitting the channel state information report on the one or more resources is based at least in part on the channel state information report count.

Aspect 28: The method of aspect 27, further comprising refraining from transmitting, in a third active duration of the discontinuous reception cycle, a subsequent channel state information report based at least in part on the channel state information report count satisfying a threshold.

Aspect 29: A method for wireless communications at a base station, comprising: receiving, in a first active duration of a discontinuous reception cycle, a channel state information report on one or more resources; and transmitting, in a second active duration of the discontinuous reception cycle, control information on a downlink control channel for a UE based at least in part on the channel state information report.

Aspect 30: The method of aspect 29, further comprising monitoring the one or more resources, wherein receiving, in the first active duration of the discontinuous reception cycle, the channel state information report on the one or more resources is based at least in part on the monitoring.

Aspect 31: The method of any of aspects 29 through 30, further comprising receiving an indication that the UE requests reporting of the channel state information report in the first active duration of the discontinuous reception cycle, wherein receiving, in the first active duration of the discontinuous reception cycle, the channel state information report on the one or more resources is based at least in part on the indication.

Aspect 32: The method of aspect 31, further comprising transmitting a message comprising a configuration indicating one or more resources of an uplink channel for the indication that the UE requests reporting of the channel state information report, wherein receiving the indication that the UE requests reporting of the channel state information report comprises receiving the indication that the UE requests reporting of the channel state information report on the one or more resources of the uplink channel.

Aspect 33: The method of aspect 32, wherein the configuration comprises a radio resource control configuration.

Aspect 34: The method of any of aspects 29 through 33, further comprising transmitting a timer configuration corresponding to a channel state information reporting timer.

Aspect 35: The method of any of aspects 29 through 34, further comprising transmitting a timer configuration corresponding to a downlink channel timer.

Aspect 36: The method of any of aspects 29 through 35, further comprising transmitting a message comprising a channel state information reporting configuration, wherein receiving, in the first active duration of the discontinuous reception cycle, the channel state information report on the one or more resources is based at least in part on the channel state information reporting configuration.

Aspect 37: The method of aspect 36, wherein the channel state information reporting configuration comprises a radio resource control configuration.

Aspect 38: The method of any of aspects 29 through 37, further comprising: transmitting, in a pre-wakeup window of a subsequent discontinuous reception cycle, a wakeup signal that indicates a third active duration of the subsequent discontinuous reception cycle for the UE; and transmitting, in the third active duration of the subsequent discontinuous reception cycle, the downlink control channel for the control information for the UE based at least in part on the wakeup signal.

Aspect 39: The method of any of aspects 29 through 38, further comprising transmitting a message comprising a configuration associated with a channel state information report count, wherein the configuration comprises a radio resource control configuration, and receiving, in the first active duration of the discontinuous reception cycle, the channel state information report on the one or more resources is based at least in part on the channel state information report count.

Aspect 40: The method of any of aspects 29 through 39, wherein the one or more resources comprise one or more persistent scheduled resources.

Aspect 41: The method of any of aspects 29 through 40, wherein the one or more resources comprise one or more semi-persistent scheduled resources.

Aspect 42: The method of any of aspects 29 through 41, wherein the downlink control channel comprises a physical downlink control channel.

Aspect 43: The method of any of aspects 29 through 42, wherein one or more of the first active duration or the second active duration of the discontinuous reception cycle are contiguous.

Aspect 44: The method of any of aspects 29 through 43, wherein one or more of the first active duration or the second active duration of the discontinuous reception cycle are noncontiguous.

Aspect 45: The method of any of aspects 29 through 44, wherein the first active duration and the second active duration occur in a same active duration of the discontinuous reception cycle.

Aspect 46: An apparatus for wireless communications at a UE, comprising a processor; memory coupled with the processor; and instructions stored in the memory and executable by the processor to cause the apparatus to perform a method of any of aspects 1 through 28.

Aspect 47: An apparatus for wireless communications at a UE, comprising at least one means for performing a method of any of aspects 1 through 28.

Aspect 48: A non-transitory computer-readable medium storing code for wireless communications at a UE, the code comprising instructions executable by a processor to perform a method of any of aspects 1 through 28.

Aspect 49: An apparatus for wireless communications at a base station, comprising a processor; memory coupled with the processor; and instructions stored in the memory and executable by the processor to cause the apparatus to perform a method of any of aspects 29 through 45.

Aspect 50: An apparatus for wireless communications at a base station, comprising at least one means for performing a method of any of aspects 29 through 45.

Aspect 51: A non-transitory computer-readable medium storing code for wireless communications at a base station, the code comprising instructions executable by a processor to perform a method of any of aspects 29 through 45.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A network entity, comprising:
   a processing system that includes processor circuitry and memory circuitry that stores code, the processing system configured to cause the network entity to:
      receive an indication that a user equipment (UE) requests reporting of channel state information in an active duration of a discontinuous reception cycle in association with there being an absence of a wakeup signal for the UE in a prior wakeup signal monitoring occasion for the UE, the prior wakeup signal monitoring occasion being in an inactive duration of the discontinuous reception cycle; and
      receive, in the active duration of the discontinuous reception cycle, a channel state information report that includes channel state information associated with measurements of one or more reference signals, the channel state information report being received in association with receiving the indication that the UE requests reporting of channel state information despite there being the absence of the wakeup signal for the UE in the prior wakeup signal monitoring occasion.

2. The network entity of claim 1, wherein the processing system is further configured to cause the network entity to perform a beam management operation with the UE in association with receiving the channel state information report.

3. The network entity of claim 1, wherein the processing system is further configured to cause the network entity to transmit a timer configuration corresponding to a channel state information reporting timer, wherein the processing system is configured to cause the network entity to receive the channel state information report based at least in part on the channel state information reporting timer.

4. The network entity of claim 1, wherein the processing system is further configured to cause the network entity to transmit a message comprising a configuration indicating one or more resources of an uplink channel for the UE to use to transmit the indication that the UE requests reporting of the channel state information.

5. The network entity of claim 4, wherein the configuration comprises a radio resource control configuration.

6. The network entity of claim 4, wherein the uplink channel comprises a physical uplink control channel.

7. The network entity of claim 4, wherein the one or more resources of the uplink channel for the UE to use to transmit the indication that the UE requests reporting of the channel state information correspond to one or more scheduling request resources.

8. The network entity of claim 1, wherein the processing system is further configured to cause the network entity to transmit a message comprising a channel state information reporting configuration for the UE to use to autonomously transmit the channel state information report.

9. The network entity of claim 8, wherein the channel state information reporting configuration comprises a radio resource control configuration.

10. The network entity of claim 1, wherein the processing system is further configured to cause the network entity to transmit a timer configuration corresponding to a downlink channel timer for the UE to use to monitor a downlink control channel for control information for the UE.

11. The network entity of claim 10, wherein the processing system is further configured to cause the network entity to transmit the downlink control channel including the control information based at least in part on the channel state information report and in association with the timer configuration.

12. The network entity of claim 1, wherein the processing system is further configured to cause the network entity to transmit one or more channel state information reference signals in the active duration of discontinuous reception cycle, wherein the processing system is configured to cause the network entity to receive the channel state information report that includes the channel state information based at least in part on the one or more channel state information reference signals.

13. The network entity of claim 12, wherein the channel state information comprises a channel quality indicator.

14. The network entity of claim 12, wherein the channel state information comprises a layer one reference signal received power.

15. The network entity of claim 1, wherein the processing system is further configured to cause the network entity to receive the channel state information report on one or more persistent scheduled resources.

16. The network entity of claim 1, wherein the processing system is further configured to cause the network entity to receive the channel state information report on one or more semi-persistent scheduled resources.

17. A method for wireless communication at a network entity, comprising:
   receiving an indication that a user equipment (UE) requests reporting of channel state information in an active duration of a discontinuous reception cycle in association with there being an absence of a wakeup signal for the UE in a prior wakeup signal monitoring occasion for the UE, the prior wakeup signal monitoring occasion being in an inactive duration of the discontinuous reception cycle; and receiving, in the active duration of the discontinuous reception cycle, a channel state information report that includes channel state information associated with measurements of one or more reference signals, the channel state information report being received in association with receiving the indication that the UE requests reporting of channel state information despite there being the absence of the wakeup signal for the UE in the prior wakeup signal monitoring occasion.

18. The method of claim 17, further comprising performing a beam management operation with the UE in association with receiving the channel state information report.

19. The method of claim 17, further comprising transmitting a timer configuration corresponding to a channel state information reporting timer, wherein receiving the channel state information report is based at least in part on the channel state information reporting timer.

20. The method of claim 17, further comprising transmitting a message comprising a configuration indicating one or more resources of an uplink channel for the UE to use to transmit the indication that the UE requests reporting of the channel state information.

21. The method of claim 20, wherein the configuration comprises a radio resource control configuration.

22. The method of claim 20, wherein the uplink channel comprises a physical uplink control channel.

23. The method of claim 20, wherein the one or more resources of the uplink channel for the UE to use to transmit the indication that the UE requests reporting of the channel state information corresponds to one or more scheduling request resources.

24. The method of claim 17, further comprising transmitting a message comprising a channel state information reporting configuration for the UE to use to autonomously transmit the channel state information report.

25. The method of claim 17, wherein the channel state information reporting configuration comprises a radio resource control configuration.

26. The method of claim 17, further comprising transmitting a timer configuration corresponding to a downlink channel timer for the UE to use to monitor a downlink control channel for control information for the UE.

27. The method of claim 26, further comprising transmitting the downlink control channel including the control information based at least in part on the channel state information report and in association with the timer configuration.

28. The method of claim 17, further comprising transmitting one or more channel state information reference signals in the active duration of discontinuous reception cycle, wherein receiving the channel state information report that includes the channel state information is based at least in part on the one or more channel state information reference signals.

29. The method of claim 28, wherein the channel state information comprises a channel quality indicator.

30. The method of claim 28, wherein the channel state information comprises a layer one reference signal received power.

* * * * *